United States Patent
Higuchi et al.

(10) Patent No.: US 8,932,151 B2
(45) Date of Patent: Jan. 13, 2015

(54) SOLID GOLF BALL

(71) Applicant: Bridgestone Sports Co., Ltd., Tokyo (JP)

(72) Inventors: Hiroshi Higuchi, Chichibushi (JP); Hirotaka Shinohara, Sekishi (JP); Motoki Furuyama, Sekishi (JP); Tasuku Takita, Sekishi (JP); Takashi Ohira, Chichibushi (JP); Daisuke Arai, Chichibushi (JP); Yuichiro Ozawa, Chichibushi (JP); Katsunori Sato, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 157 days.

(21) Appl. No.: 13/632,671

(22) Filed: Oct. 1, 2012

(65) Prior Publication Data
US 2013/0172108 A1 Jul. 4, 2013

Related U.S. Application Data

(63) Continuation-in-part of application No. 13/341,138, filed on Dec. 30, 2011.

(51) Int. Cl.
*A63B 37/04* (2006.01)
*A63B 37/00* (2006.01)
*C08K 5/00* (2006.01)

(52) U.S. Cl.
CPC ......... *A63B 37/0065* (2013.01); *A63B 37/0012* (2013.01); *A63B 37/0017* (2013.01); *A63B 37/0021* (2013.01); *A63B 37/29* (2013.01); *A63B 37/0031* (2013.01); *A63B 37/0051* (2013.01); *A63B 37/0074* (2013.01); *A63B 37/0084* (2013.01); *A63B 37/0087* (2013.01); *C08K 5/00* (2013.01); *A63B 37/0018* (2013.01); *A63B 37/002* (2013.01); *A63B 37/0063* (2013.01)
USPC ............................ 473/371; 524/406; 525/261

(58) Field of Classification Search
USPC .................. 473/371–374, 377, 378, 383, 384
See application file for complete search history.

(56) References Cited

U.S. PATENT DOCUMENTS

| | | | | |
|---|---|---|---|---|
| 6,203,450 | B1 * | 3/2001 | Bradley et al. | 473/351 |
| 6,642,314 | B2 | 11/2003 | Sone et al. | |
| 6,750,281 | B2 * | 6/2004 | Hirau et al. | 524/406 |

(Continued)

FOREIGN PATENT DOCUMENTS

| | | |
|---|---|---|
| JP | 2002-293996 A | 10/2002 |
| JP | 2011-5329 A | 1/2011 |
| JP | 11-35633 A | 2/2011 |

*Primary Examiner* — Gene Kim
*Assistant Examiner* — John E Simms, Jr.
(74) *Attorney, Agent, or Firm* — Sughrue Mion, PLLC

(57) ABSTRACT

The invention provides a solid golf ball having a core and a cover. The core is formed of a rubber composition containing a base rubber, a co-crosslinking agent, a crosslinking initiator and a metal oxide. The base rubber contains polybutadiene, a styrene-butadiene rubber and, optionally, an isoprene rubber. The co-crosslinking agent is methacrylic acid, and the rubber composition includes a specific waste material in the form of a powder. The core deflection and the cover material are optimized. Utilizing a waste material in a solid golf ball conserves resources and thus is beneficial to the global environment. Even during prolonged use, the golf ball maintains its basic performance attributes (feel, flight, durability) at a high level.

14 Claims, 4 Drawing Sheets

(56) References Cited

U.S. PATENT DOCUMENTS

| | | |
|---|---|---|
| 7,294,680 B2 | 11/2007 | Sone et al. |
| 2003/0120098 A1* | 6/2003 | Higuchi et al. ............... 556/131 |
| 2004/0180735 A1* | 9/2004 | Sullivan ....................... 473/371 |
| 2005/0187038 A1* | 8/2005 | Sasaki et al. .................. 473/378 |
| 2006/0276596 A1* | 12/2006 | Hayashi et al. ............... 525/261 |
| 2007/0117655 A1* | 5/2007 | Kasashima et al. ........... 473/371 |
| 2009/0221387 A1* | 9/2009 | Ohama et al. ................. 473/383 |
| 2013/0116066 A1* | 5/2013 | Shinohara ..................... 473/377 |

* cited by examiner

FIG.5

BRIDGESTONE

SOLID GOLF BALL

CROSS-REFERENCE TO RELATED APPLICATION

This application is a continuation-in-part of copending application Ser. No. 13/341,138 filed on Dec. 30, 2011, the entire contents of which are hereby incorporated by reference.

BACKGROUND OF THE INVENTION

The present invention relates to a golf ball which, in long-term use, has an excellent durability to cracking, durability of appearance and durability to ball surface loss, which utilizes a waste material and thus is environmentally beneficial and moreover which, even with the use of a waste material, is able to maintain the basic ball performance (feel, flight, durability) at a high level.

In order to ensure the durability of a golf ball in long-term use, it is necessary to enhance, for example, the durability of each member of the ball and the wear resistance of the outside surface. Recently, from an environmental standpoint, the idea of utilizing waste materials by incorporating such materials in golf ball core- or cover-forming materials has begun to emerge in the golf ball industry. The basic performance attributes of golf balls include flight, feel at impact, and durability. When a waste material is included in the core or cover, it is essential to choose the type and amount of waste material included in such a way as not to markedly worsen these basic attributes.

For example, U.S. Pat. No. 6,203,450 describes the compounding of polyurethane rubber in the core material. However, the resulting golf balls can hardly be said to have a suitable feel, and moreover are unable to achieve a reduced spin rate.

JP-A 2011-005329 discloses that, by granulating an ionomer resin which was used as a cover material and including the granulated resin in a core-forming rubber composition, it is possible to utilize such a waste material while suppressing a decline in ball performance.

Also, as is widely known, two-piece solid golf balls are composed of a core and a cover, with the core being a crosslinked rubber material of certain desirable properties obtained by using a base rubber composed primarily of cis-1,4-polybutadiene rubber to which compounding ingredients such as a co-crosslinking agent, a metal oxide and an organic peroxide have been added. For example, JP-A 59-49779 teaches a rubber composition for the core of a two-piece solid golf ball, which composition is obtained by compounding a given amount of zinc methacrylate as a co-crosslinking agent in cis-1,4-polybutadiene rubber. However, when zinc methacrylate is used in this way in a core-forming rubber composition, achieving good ball durability in long-term use is difficult.

In addition, JP-A 2003-70936, JP-A 2007-61614, JP-A 2007-301357, JP-A 2010-115485, JP-A 2010-115486, JP-A 2004-180793, JP-A 2008-149190, JP-A 2009-195761, JP-A 2005-27814, and JP-A 2010-269147 all describe, as rubber compositions for the cores of two-piece solid golf balls, the compounding of given amounts of zinc acrylate in cis-1,4-polybutadiene rubber. However, here too, when zinc acrylate is used in the core-forming rubber composition, achieving good ball durability in long-term use has been difficult.

Prior art relating to this invention is described in JP-A 2002-126128, which is directed at a one-piece golf ball having an optimized internal hardness profile from the surface toward the center of the ball. However, this prior-art golf ball lacks a satisfactory durability to "surface loss" when hit with the sharp portion of a clubhead, such as the leading edge of an iron.

SUMMARY OF THE INVENTION

It is therefore an object of the present invention to provide a solid golf ball having a polyurethane cover, which golf ball has, in long-term use, an excellent durability to cracking, durability of appearance and durability to ball surface loss, utilizes a waste material and thus is environmentally beneficial, and moreover, even with the use of a waste material, is able to maintain the basic performance attributes of the ball at a high level.

As a result of extensive investigations, the inventors have discovered that, in the fabrication of a solid golf ball having a core and a cover, by having a core-forming rubber composition which uses a mixture of polybutadiene and styrene-butadiene rubber as the base rubber—the styrene-butadiene rubber being set to an optimized styrene bond content, and which moreover uses methacrylic acid as the co-crosslinking agent and contains a specific amount of a crosslinking initiator, include also a specific amount of one or more powder selected from among the following materials that have previously been disposed of as waste materials: (I-a) a rubber powder obtained by granulating a rubber material containing methacrylic acid (MAA) or a metal salt thereof, (I-b) a rubber powder obtained by granulating a rubber material containing acrylic acid (AA) or a metal salt of acrylic acid, such as zinc acrylate (ZDA), and (II) a polyurethane resin powder, adhesion between the core and the cover can be dramatically improved. The inventors have also discovered that, by optimizing the deflection of the core when a specific load is applied thereto, the initial velocity of the ball and the dimple spatial occupancy VR, and moreover by using a resin material having a breaking strength of from 20 to 80 MPa and an elongation of from 150 to 600% as the cover material, owing to synergistic effects between these materials, the resulting ball is endowed with an excellent durability to cracking, durability to surface loss and durability to abrasion that exceed the expectations of golf ball designers. As a result, even when a powder that has previously been disposed of as a waste material is added, a golf ball is obtained in which the durability to cracking can be dramatically improved without lowering the basic performance of the ball and which thus has a good feel at impact and a good flight performance while maintaining a good appearance even in long-term use.

That is, in the present invention, by including methacrylic acid as a co-crosslinking agent in the core-forming rubber composition and by optimizing the amount of methacrylic acid and the amount of crosslinking initiator, the durability to cracking can be made much better than that in game balls. Moreover, by selecting one or more type of powder from among (I-a) a rubber powder obtained by granulating a rubber material containing methacrylic acid (MAA) or a metal salt thereof, (I-b) a rubber powder obtained by granulating a rubber material containing acrylic acid (AA) or a metal salt of acrylic acid, such as zinc acrylate (ZDA), and (II) a polyurethane resin powder, and including the powder or powders in a suitable amount within the core-forming rubber composition, adhesion between the core and the cover dramatically improves. Also, by using a resin material having a high strength and elongation to form the cover, golf balls endowed with excellent durability to cracking, durability to surface loss and durability to abrasion can be obtained. In addition, in the present invention, by optimizing the cross-sectional shape of dimples formed on the surface of the ball, there can be obtained golf balls having, in long-term use, an excellent durability of markings thereon. Finally, by optimizing the hardness profile at the core interior, golf balls having a good feel at impact can be obtained.

Accordingly, the invention provides the following solid golf ball.

[1] A solid golf ball comprising a core and a cover, wherein the core is formed of a rubber composition comprising a base rubber, a co-crosslinking agent, a crosslinking initiator and a metal oxide, the base rubber containing polybutadiene, a styrene-butadiene rubber and, optionally, an isoprene rubber, the co-crosslinking agent being methacrylic acid, and the rubber composition including from 0.05 to 60 parts by weight of one or more powder which has a particle size of not more than 3 mm and is selected from among (I-a) a rubber powder obtained by granulating a rubber material containing methacrylic acid or a metal salt thereof, (I-b) a rubber powder obtained by granulating a rubber material containing acrylic acid or a metal salt of acrylic acid and (II) a polyurethane resin powder per 100 parts by weight of the base rubber;

the core has a deflection when compressed under a final load of 1,275 N (130 kgf) from an initial load of 98 N (10 kgf) of from 2.5 to 7.0 mm;

the cover is formed of a resin material having a breaking strength of from 20 to 80 MPa and an elongation of from 150 to 600%; and the ball has formed on a surface thereof a plurality of dimples, each having a spatial volume below a flat plane circumscribed by an edge of the dimple, the sum of the dimple spatial volumes, expressed as a percentage (VR) of the volume of a hypothetical sphere were the ball to have no dimples on the surface thereof, being from 0.95 to 1.7.

[2] The solid golf ball of [1], wherein the metal oxide is zinc oxide.

[3] The solid golf ball of [1], wherein the polybutadiene accounts for up to 80 wt % of the base rubber in the rubber composition, the styrene-butadiene rubber accounts for between 20 and 80 wt % of the base rubber and the isoprene rubber accounts for between 0 and 60 wt % of the base rubber; and wherein the rubber composition includes from 6 to 40 parts by weight of methacrylic acid, from 6 to 30 parts by weight of the metal oxide, from 0.3 to 5.0 parts by weight of the crosslinking initiator, and from 0.1 to 1.0 part by weight of the antioxidant per 100 parts by weight of the base rubber.

[4] The solid golf ball of [1], wherein the core has a specific gravity of from 1.05 to 1.2.

[5] The solid golf ball of [1], wherein the polyurethane resin powder (II) has a particle size of not more than 1 mm.

[6] The solid golf ball of [1], wherein the polyurethane resin powder (II) is composed primarily of a thermoplastic polyurethane and has a flow starting point of from 150 to 320° C.

[7] The solid golf ball of [1], wherein the resin material of the cover is composed primarily of a polyurethane.

[8] The solid golf ball of [7], wherein the polyurethane is a thermoplastic polyurethane.

[9] The solid golf ball of [1], wherein the cover has a material hardness, expressed in terms of Shore D hardness, of from 30 to 57.

[10] The solid golf ball of [1], wherein the cover has a thickness of from 0.3 to 2.5 mm.

[11] The solid golf ball of [1], wherein the ball has an initial velocity of not more than 72 m/s.

[12] The solid golf ball of [1], wherein the core has a deflection CH (mm) when compressed under a final load of 1,275 N (130 kgf) from an initial load of 98 N (10 kgf), the ball has, upon initial measurement, a deflection BH1 (mm) when compressed under a final load of 1,275 N (130 kgf) from an initial load of 98 N (10 kgf) and an initial velocity BV1 (m/s), and also has, when measured again after 350 days of standing following initial measurement, a deflection BH2 (mm) when compressed under a final load of 1,275 N 130 kgf) from an initial load of 98 N (10 kgf) and an initial velocity BV2 (m/s), such that:

BH1 is from 2.5 to 7.0 mm,
the ratio CH/BH1 is from 0.95 to 1.1,
the difference BH2-BH1 is not more than 0.2 mm, and
the difference BV2-BV1 is not more than 0.3 m/s.

[13] The solid golf ball of [1], wherein the dimples formed on the surface of the ball satisfy conditions (1) to (6) below:

(1) the dimples have a peripheral edge provided with a roundness represented by a radius of curvature R of from 0.5 to 2.5 mm;

(2) the ratio ER of a collective number of dimples RA having a radius of curvature R to diameter D ratio (R/D) of at least 20%, divided by a total number of dimples N on the surface of the ball, is from 15 to 95%;

(3) the ball has thereon a plurality of dimple types of differing diameter, and the ratio DER of a combined number of dimples DE obtained by adding together dimples having an own diameter and an own radius of curvature larger than or equal to a radius of curvature of dimples of larger diameter than said own diameter plus dimples of a type having a largest diameter, divided by the total number of dimples N on the surface of the ball, is at least 80%;

(4) the number of dimple types of differing diameter is 3 or more;

(5) the total number of dimples N is not more than 380; and (6) the surface coverage SR of the dimples, which is the sum of individual dimple surface areas, each defined by a flat plane circumscribed by an edge of the dimple, expressed as a percentage of the surface area of a hypothetical sphere were the ball to have no dimples on the surface thereof, is from 60 to 74%.

BRIEF DESCRIPTION OF THE DIAGRAMS

FIG. 5 is a top view showing the markings that were placed on the golf balls fabricated in the examples and the comparative examples.

DETAILED DESCRIPTION OF THE INVENTION

The invention is described more fully below.

Figure 1:
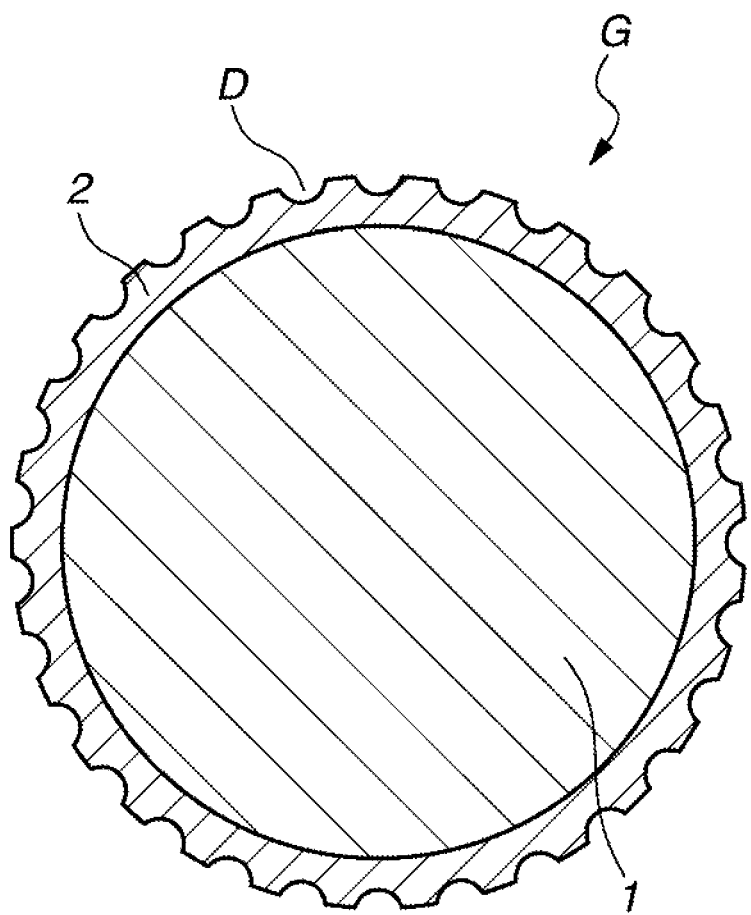
FIG. 1 is a schematic cross-sectional diagram of a solid golf ball according to one embodiment of the invention.

The solid golf ball of the invention has a structure which is exemplified by, as shown in FIG. 1, a two-piece solid golf ball G having a core 1 and a cover 2 that encases the core. The cover 2 has a surface on which, typically, a plurality of dimples D are formed. In the diagram, the core 1 and the cover 2 are each formed as single layers, although either or both may be composed of a plurality of layers.

In the above core within the golf ball of the invention, one or more powder selected from among the subsequently described two types of specific rubber powders (I-a) and (I-b) and the subsequently described polyurethane resin powder (II) is included in the material composed primarily of rubber. The core-forming material and the powders included in this material are described below.

In the invention, preferred rubber compositions for forming the core are exemplified by the rubber compositions formulated as described below.

The core is obtained by vulcanizing a rubber composition composed primarily of a rubber material. A rubber composition containing a base rubber, a co-crosslinking agent, a crosslinking initiator, a metal oxide, an antioxidant and, optionally, an inert filler may be used as this rubber composition.

Polybutadiene is preferably used as the base rubber in this rubber composition; in particular, the use of a mixture of polybutadiene with a styrene-butadiene rubber and/or an isoprene rubber is recommended. In the invention, as is subsequently described, the core cross-sectional hardness changes in specific ways from the surface to the center of the core, and it is desirable to adjust the core cross-sectional hardness profile within certain preferred ranges. To this end, in formulating the core, it is essential to suitably adjust, for example, the amounts in which the various subsequently described compounding ingredients are included, the vulcanization temperature and the vulcanization time.

Although no particular limitation is imposed on the polybutadiene used as the rubber component, it is recommended that this polybutadiene have a cis-1,4 bond content of at least 60 wt %, preferably at least 80 wt %, more preferably at least 90 wt %, and most preferably at least 95 wt %. If the cis-1,4 bond content is too low, the rebound may decrease. Also, although not subject to any particular limitation, it is recommended that the polybutadiene have a 1,2-vinyl bond content of preferably not more than 2 wt %, more preferably not more than 1.7 wt %, and even more preferably not more than 1.5 wt %.

The polybutadiene has a Mooney viscosity ($ML_{1+4}$ (100° C.)) which, although not subject to any particular limitation, is preferably at least 30, more preferably at least 35, and even more preferably at least 40. The upper limit may be set to preferably not more than 100, more preferably not more than 80, even more preferably not more than 70, and most preferably not more than 60.

The term "Mooney viscosity" used herein refers to an industrial indicator of viscosity (JIS K 6300) as measured with a Mooney viscometer, which is a type of rotary plastometer. This value is represented by the unit symbol $ML_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

In order to obtain the rubber composition in a molded and vulcanized form which has a good rebound, it is preferable for the polybutadiene to have been synthesized using a rare-earth catalyst or a Group VIII metal compound catalyst.

The rare-earth catalyst is not subject to any particular limitation, although preferred use can be made of a catalyst which employs a lanthanum series rare-earth compound. Also, where necessary, an organoaluminum compound, an alumoxane, a halogen-bearing compound and a Lewis base may be used in combination with the lanthanum series rare-earth compound. Preferred use can be made of, as the various above compounds, those compounds mentioned in JP-A 11-35633, JP-A 11-164912 and JP-A 2002-293996.

Of the above rare-earth catalysts, the use of a neodymium catalyst that employs a neodymium compound, which is a lanthanide series rare-earth compound, is especially recommended. In such a case, a polybutadiene rubber having a high cis-1,4 bond content and a low 1,2-vinyl bond content can be obtained at an excellent polymerization activity.

The polybutadiene has a molecular-weight distribution Mw/Mn (Mw being the weight-average molecular weight, and Mn being the number-average molecular weight) of preferably at least 1.0, more preferably at least 2.0, even more preferably at least 2.2, and most preferably at least 2.4. The upper limit is preferably not more than 6.0, more preferably not more than 5.0, and even more preferably not more than 4.5. If Mw/Mn is too low, the workability may decrease. On the other hand, if Mw/Mn is too high, the rebound may decrease.

It is recommended that the proportion of the overall base rubber represented by the above polybutadiene, although not subject to any particular limitation, be set to preferably not more than 80 wt %, more preferably not more than 70 wt %, even more preferably not more than 60 wt %, and most preferably not more than 57 wt %. The lower limit may be set to preferably at least 30 wt %, more preferably at least 35 wt %, and even more preferably at least 38 wt.

Illustrative examples of cis-1,4-polybutadiene rubbers which may be used include the high-cis products BR01, BR11, BR02, BR02L, BR02LL, BR730 and BR51, all of which are available from JSR Corporation.

In the invention, a styrene-butadiene rubber (SBR) is used together with the above polybutadiene (BR) as the base rubber. The styrene-butadiene rubber (SBR) is described below.

A solution-polymerized styrene-butadiene rubber or an emulsion-polymerized styrene-butadiene rubber may be used as the styrene-butadiene rubber (SBR). For example, use may be made of the solution-polymerized products SBR-SL552, SBR-SL555 and SBR-SL563 (available from JSR Corporation) as the solution-polymerized styrene-butadiene rubber, and use may be made of the emulsion-polymerized products SBR 1500, SBR 1502, SBR 1507 and SBR 0202 (available from JSR Corporation) as the emulsion-polymerized styrene-butadiene rubber.

The styrene bond content in the styrene-butadiene rubber is preferably at least 5 wt %, more preferably at least 10 wt %, even more preferably at least 15 wt %, and most preferably at least 18 wt %. The upper limit is preferably not more than 35 wt %, more preferably not more than 30 wt %, even more preferably not more than 25 wt %, and most preferably not more than 22 wt %. If the styrene bond content is too high, due to temperature changes on account of seasonal differences, the core will become harder and large changes will occur in the rebound. On the other hand, if the styrene bond content is too low, the ease of operation during surface grinding of the core will dramatically decrease.

The styrene-butadiene rubber accounts for a proportion of the overall base rubber which is preferably at least 20 wt %, more preferably at least 25 wt %, even more preferably at least 30 wt %, and most preferably at least 35 wt %. The upper limit is preferably not more than 80 wt %, more preferably not more than 70 wt %, even more preferably not more than 60 wt %, and most preferably not more than 57 wt %.

Rubber ingredients other than the above polybutadiene and styrene-butadiene rubber (SBR) may also be included in the base rubber, insofar as the objects of the invention are attainable. Illustrative examples of rubber ingredients other than the above polybutadiene and styrene-butadiene rubber (SBR) include polybutadienes other than the above polybutadiene, and other diene rubbers such as natural rubbers, isoprene rubbers and ethylene-propylene-diene rubbers.

Isoprene rubbers (IR) which may be used include those having a cis-1,4 bond content of at least 60 wt %, preferably at least 80 wt %, and more preferably at least 90 wt %, and having a Mooney viscosity ($ML_{1+4}$ (100° C.)) of at least 60, preferably at least 70, and more preferably at least 80, with an upper limit of not more than 90, and preferably not more than 85. For example, the product IR2200 available from JSR Corporation may be used. The proportion of the overall base rubber represented by other rubber ingredients is preferably 0 wt % or more, more preferably at least 2 wt %, and most preferably at least 5 wt %. The upper limit is preferably not more than 60 wt %, more preferably not more than 40 wt %, even more preferably not more than 20 wt %, and most preferably not more than 10 wt %.

In the invention, methacrylic acid is an essential ingredient which is included as the co-crosslinking agent. Methacrylic acid is included in an amount, per 100 parts by weight of the base rubber, of preferably at least 6 parts by weight, more preferably at least 8 parts by weight, even more preferably at least 10 parts by weight, and most preferably at least 11.5 parts by weight. The upper limit in the amount of methacrylic acid is preferably not more than 40 parts by weight, more preferably not more than 35 parts by weight, even more preferably not more than 30 parts by weight, and most preferably not more than 25 parts by weight. Including too much co-crosslinking agent may make the core too hard, giving the ball an unpleasant feel at impact. On the other hand, including too little co-crosslinking agent may make the core too soft, again giving the ball an unpleasant feel at impact.

It is preferable to use an organic peroxide as the crosslinking initiator. Examples of commercial products that may be advantageously used include Percumyl D (from NOF Corporation), Trigonox 29-40b (Akzo Nobel N.V.) and Perhexa C-40 (NOF Corporation). These may be used singly or as a combination of two or more thereof.

The amount of crosslinking initiator included per 100 parts by weight of the base rubber may be set to preferably at least 0.3 part by weight, more preferably at least 0.5 part by weight, and even more preferably at least 0.7 part by weight. The upper limit in the amount of crosslinking initiator may be set to preferably not more than 5.0 parts by weight, more preferably not more than 4.0 parts by weight, even more preferably not more than 3.0 parts by weight, and most preferably not more than 2.0 parts by weight. Including too much crosslinking initiator may make the core too hard, giving the ball an unpleasant feel at impact and also substantially lowering the durability to cracking. On the other hand, including too little crosslinking initiator may make the core too soft, giving the ball an unpleasant feel at impact and also substantially lowering productivity.

Zinc oxide is preferably used as the metal oxide in this invention, although metal oxides other than zinc oxide may be used, insofar as the objects of the invention are attainable. The metal oxide is included in an amount, per 100 parts by weight of the base rubber, of preferably at least 6 parts by weight, more preferably at least 8 parts by weight, even more preferably at least 10 parts by weight, and most preferably at least 12 parts by weight. The upper limit in the amount of metal oxide is preferably not more than 30 parts by weight, more preferably not more than 28 parts by weight, even more preferably not more than 26 parts by weight, and most preferably not more than 24 parts by weight. Including too much or too little metal oxide may make it impossible to obtain a suitable weight and a good hardness and rebound.

In working the invention, it is preferable to include an antioxidant in the rubber composition. For example, use may be made of the commercial products Nocrac NS-6, Nocrac NS-30 and Nocrac 200, all available from Ouchi Shinko Chemical Industry Co., Ltd. These may be used singly or as combinations of two or more thereof.

The amount of antioxidant included, although not subject to any particular limitation, is preferably at least 0.1 part by weight, and more preferably at least 0.15 part by weight, per 100 parts by weight of the base rubber. The upper limit is preferably not more than 1.0 part by weight, more preferably not more than 0.7 part by weight, and even more preferably not more than 0.4 part by weight. Including too much or too little antioxidant may make it impossible to achieve a suitable core hardness gradient, as a result of which a good rebound, good durability and good spin rate-lowering effect on full shots may not be achieved.

Preferred use may be made of, for example, barium sulfate, calcium carbonate or silica as the inert filler. Any one of these may be used alone or two or more may be used in combination. The amount of inert filler included is not particularly limited, although this amount is preferably more than 0, and may be set to preferably at least 1 part by weight, and more preferably at least 5 parts by weight, per 100 parts by weight of the base rubber. The upper limit in the amount of inert filler included may be set to preferably not more than 50 parts by weight, more preferably not more than 40 parts by weight, and even more preferably not more than 30 parts by weight. If the amount of inert filler included is too large or too small, a suitable weight and a good hardness and rebound may not be achieved.

In the practice of the invention, in order to improve the durability of the ball and also from a resource recycling standpoint, one or more type of powder selected from among specific rubber powders (I-a) and (I-b) and a polyurethane resin powder (II) is included in the rubber ingredients of the core. The rubber powders (I) and the polyurethane resin powder (II) used in the invention may be obtained by Method (i) or Method (ii) below.

Method (i)

Materials obtained by finely grinding, in cases where golf ball covers are formed of a polyurethane resin, the resin from runners discharged as waste during the molding of such golf ball covers as well as flash generated during such molding, defectively molded cores, and also the powder obtained when golf balls and golf ball cores are surface ground, can be advantageously used as the specific rubber powders (I-a) and (I-b) and the polyurethane resin powder (II).

Method (ii)

Use can be made of materials obtained by employing a granulator to finely grind defective moldings and golf balls which have been used and discarded, screening the finely ground material, and thereby collecting the specific rubber powders (I-a) and (I-b) and the polyurethane resin powder (II) having particle sizes at or below a given size. When golf balls are granulated, the resulting material may be contaminated with impurities such as paint and ink. However, this material may be directly incorporated into the rubber composition if the amount of such contamination is not large.

The particle sizes of the above rubber powders (I-a) and (I-b) and the polyurethane resin powder (II), expressed as the size of the screen openings, must be set to not more than 3 mm, and may be set to preferably 2 mm or less, more preferably 1.5 mm or less, and even more preferably 1 mm or less. If the particle sizes of the rubber powders (I-a) and (I-b) and the polyurethane resin powder (II) exceed the above-indicated size, the durability of the golf ball may be adversely affected, in addition to which it may not be possible to fully ensure adhesion due to an anchoring effect.

The polyurethane resin powder (II) may be either a thermoplastic polyurethane or a thermoset polyurethane resin, although the use of a thermoplastic polyurethane is more preferred.

The present invention, by including in the core material one or more powder selected from among the two specific rubber powders (I-a) and (I-b) and the polyurethane resin powder (II), confers a suitable surface roughness to the core, thereby making it possible to increase the surface area of contact with the adjoining cover and improve adhesion due to an anchoring effect. In particular, by using a thermoplastic polyurethane in the cover material, the polyurethane resins included in the cover material and the core material melt during molding of the cover material, enabling adhesion between the core and the cover to be increased even further.

Rubber Powder (I-a)

In the invention, it is critical for the rubber powder (I-a) to include, as an essential ingredient, methacrylic acid or a metal salt thereof. By using (I-a) a rubber powder containing methacrylic acid (MAA) or a metal salt thereof, it is possible to enhance in particular the durability of the golf ball. That is, a material obtained by granulating the above-described core material can be advantageously used as the rubber powder (I-a), in which case the rubber material that is granulated will include methacrylic acid (MAA) or a metal salt thereof as the unsaturated carboxylic acid or a metal salt thereof. The amount of the methacrylic acid or a metal salt thereof which is included in the foregoing rubber powder (I-a) may be set to preferably at least 5 wt %, more preferably at least 10 wt %, and even more preferably at least 15 wt %. The upper limit may be set to preferably not more than 60 wt %, more preferably not more than 50 wt %, even more preferably not more than 40 wt %, and most preferably not more than 30 wt %. If the content is too small, the durability may worsen, and if the content is too large, the rebound may decrease.

The content of the rubber powder (I-a) per 100 parts by weight of the base rubber in the rubber composition is preferably at least 0.05 part by weight, more preferably at least 0.5 part by weight, even more preferably at least 1.5 parts by weight, and most preferably at least 3 parts by weight. The upper limit is preferably not more than 60 parts by weight, more preferably not more than 45 parts by weight, even more preferably not more than 30 parts by weight, and most preferably not more than 20 parts by weight. If the content is too low, the durability may worsen, whereas if it is too high, the workability of the rubber material may markedly decrease.

Rubber Powder (I-b)

In the invention, it is critical for the rubber powder (I-b) to include, as an essential ingredient, acrylic acid (AA) or a metal salt of acrylic acid. By using a rubber powder (I-b) containing acrylic acid (AA) or a metal salt of acrylic acid, a good golf ball durability is maintained, in addition to which the initial velocity of the ball is increased, enabling the distance traveled by the ball to be enhanced. That is, a material obtained by granulating the above-described core material can be advantageously used as the rubber powder (I-b), in which case acrylic acid (AA) or a metal salt thereof is included as an unsaturated carboxylic acid or a metal salt thereof in the rubber material that is granulated. Examples of metal salts of acrylic acid include zinc acrylate (ZDA), magnesium acrylate, sodium acrylate, potassium acrylate, aluminum acrylate and calcium acrylate. The content of the acrylic acid or a metal salt thereof which is included in the rubber powder (I-b) may be set to preferably at least 3 wt %, more preferably at least 10 wt %, and even more preferably at least 15 wt %. The upper limit may be set to preferably not more than 60 wt %, more preferably not more than 50 wt %, even more preferably not more than 40 wt %, and most preferably not more than 30 wt %. If the content is too low, the durability may be inferior, and if the content is too high, the rebound may decrease.

The content of the rubber powder (I-b) per 100 parts by weight of base rubber in the rubber composition is preferably at least 0.05 part by weight, more preferably at least 0.5 part by weight, even more preferably at least 1.5 parts by weight, and most preferably at least 3 parts by weight. The upper limit is preferably not more than 60 parts by weight, more preferably not more than 45 parts by weight, even more preferably not more than 30 parts by weight, and most preferably not more than 20 parts by weight. If the content is too low, it may not be possible to obtain a sufficient durability, whereas if it is too high, the workability may markedly decrease.

The content of the polyurethane resin powder (II) per 100 parts by weight of the rubber component is at least 0.05 part by weight, preferably at least 0.1 part by weight, more preferably at least 1.5 parts by weight, and even more preferably at least 3 parts by weight. The upper limit is preferably not more than 40 parts by weight, more preferably not more than 30 parts by weight, even more preferably not more than 20 parts by weight, and most preferably not more than 10 parts by weight. If the content is too low, it may not be possible to obtain a sufficient durability, whereas if it is too high, the workability may markedly decrease.

The combined amount of above powders (I-a), (I-b) and (II) is set to from 0.05 to 60 parts by weight per 100 parts by weight of the rubber ingredients. The lower limit in the content of these powders may be set to preferably at least 0.5 part by weight, more preferably at least 1.5 parts by weight, and even more preferably at least 3 parts by weight. The upper limit may be set to preferably not more than 50 parts by weight, more preferably not more than 35 parts by weight or less, and even more preferably 25 parts by weight or less.

When use is made of the above-described thermoplastic polyurethane powder, it is preferable to use such a powder having a flow starting point of at least 150° C. The flow starting point is more preferably at least 160° C., and even more preferably at least 170° C. The upper limit is preferably not more than 320° C., more preferably not more than 300° C., and even more preferably not more than 280° C. If the flow starting point is too low, the powder will end up melting at the time of core vulcanization, which may result in a loss of core durability and symmetry. On the other hand, if the flow starting point of the powder is too high, it will not be possible to melt the polyurethane at the surface during molding of the cover, as a result of which an additional durability improving effect arising from the use of a thermoplastic polyurethane may not be attainable.

The rubber composition containing the respective above ingredients is prepared by mixture using an ordinary mixing apparatus, such as a Banbury mixer or a roll mill. When the above rubber composition is used to mold a core, molding may be carried out by compression molding or injection molding in a given core mold. The molding thus obtained is heated and cured under temperature conditions sufficient for the organic peroxide and the co-crosslinking agent included in the rubber composition to act, thereby giving a core having a specific hardness profile. Although the vulcanization conditions are not subject to any particular limitation, the vulcanization temperature is generally from about 100° C. to about 200° C., with the lower limit being preferably at least 150° C., and more preferably at least 155° C. The upper limit is preferably not more than 180° C., more preferably not more than 175° C., and most preferably not more than 170° C. The vulcanization time is generally in a range of about 10 to about 40 minutes, with the lower limit being preferably at least 12 minutes and the upper limit being preferably not more than 30 minutes, more preferably not more than 25 minutes, and most preferably not more than 20 minutes. The core hardness profile in the invention may be achieved by the combination of the vulcanization conditions with the formulation of the rubber composition.

The core diameter, although not subject to any particular limitation, is typically at least 38.0 mm, preferably at least 38.9 mm, and more preferably at least 39.3 mm. The upper limit is preferably not more than 42.1 mm, and more preferably not more than 41.1 mm. At a core diameter outside of this range, the durability of the ball to cracking may worsen dramatically or the initial velocity of the ball may decrease.

It is recommended that the core have a specific gravity of at least 1.05, preferably at least 1.08, and more preferably at least 1.1, but not more than 1.2, preferably not more than 1.15, and more preferably not more than 1.13.

The core deflection (CH) under loading, i.e., the deflection by the core when compressed under a final load of 1,275 N (130 kgf) from an initial load of 98 N (10 kgf), is typically at least 2.5 mm, preferably at least 2.6 mm, and more preferably at least 2.7 mm, but is preferably not more than 7.0 mm, more preferably not more than 6.0 mm, even more preferably not more than 5.5 mm, and most preferably not more than 5.2 mm. If the core deflection (CH) is too small, the feel of the golf ball at impact may be so hard as to make the ball unpleasant to use. On the other hand, if the core deflection is too large, the feel of the golf ball at impact may be so soft as to make the ball unpleasant to use, in addition to which the productivity may decline considerably.

The core rebound (CV) is typically at least 60 m/s, preferably at least 63 m/s, more preferably at least 66 m/s, and most preferably at least 67 m/s. The upper limit is preferably not more than 73 m/s, more preferably not more than 72.5 m/s, and even more preferably not more than 72 m/s. A core rebound outside of this range is undesirable because the distance of the ball may dramatically decline or the ball may travel too far, making proper control of the ball impossible. As used herein, "core rebound" is synonymous with core initial velocity.

Figure 2:
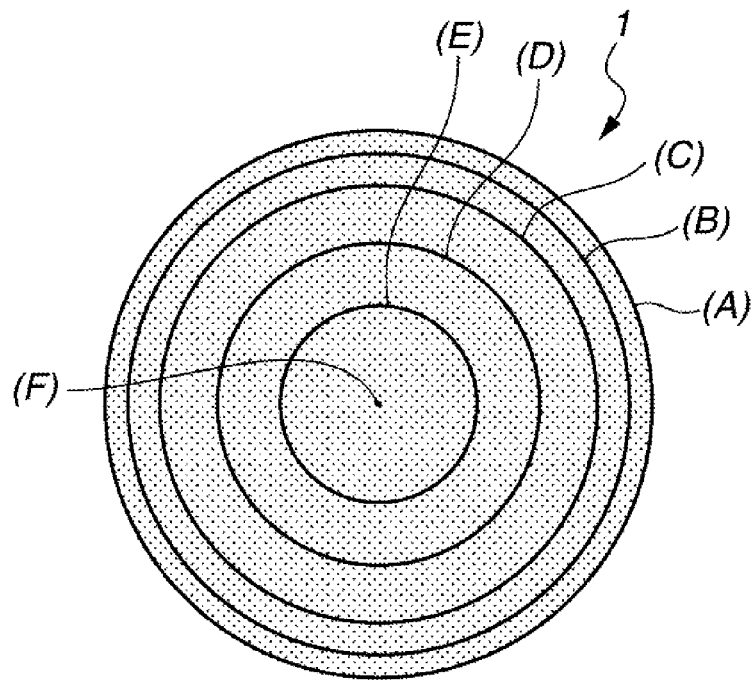
FIG. 2 is a schematic diagram of a core illustrating positions A to F in a core hardness profile.

In the present invention, as shown in the schematic diagram of the core in FIG. 2, letting A be the JIS-C hardness at the surface of the core, B be the JIS-C hardness at a position 2 mm inside the core surface, C be the JIS-C hardness at a position 5 mm inside the core surface, D be the JIS-C hardness at a position 10 mm inside the core surface, E be the JIS-C hardness at a position 15 mm inside the core surface, and F be the JIS-C hardness at the center of the core, it is preferable for the respective values A to F to fall within the specific ranges indicated below. By thus setting the hardness profile at the core interior within specific ranges, both a comfortable feel at impact and a good durability to cracking can be obtained.

Letting A be the JIS-C hardness at the surface of the core, the value of A is preferably at least 60, more preferably at least 63, and even more preferably at least 65. The upper limit is preferably not more than 88, more preferably not more than 86, and even more preferably not more than 84.

Letting B be the JIS-C hardness at a position 2 mm inside the core surface, the value of B is preferably at least 54, more preferably at least 57, and even more preferably at least 59. The upper limit is preferably not more than 83, more preferably not more than 81, and even more preferably not more than 79.

Letting C be the JIS-C hardness at a position 5 mm inside the core surface, the value of C is preferably at least 56, more preferably at least 59, and even more preferably at least 61. The upper limit is preferably not more than 85, more preferably not more than 83, and even more preferably not more than 81.

Letting D be the JIS-C hardness at a position 10 mm inside the core surface, the value of D is preferably at least 54, more preferably at least 57, and even more preferably at least 60. The upper limit is preferably not more than 80, more preferably not more than 78, and even more preferably not more than 76.

Letting E be the JIS-C hardness at a position 15 mm inside the core surface, the value of E is preferably at least 51, more preferably at least 54, and even more preferably at least 57. The upper limit is preferably not more than 75, more preferably not more than 73, even more preferably not more than 71, and most preferably not more than 70.

Letting F be the JIS-C hardness at the center of the core, the value of F is preferably at least 48, more preferably at least 51, and even more preferably at least 54. The upper limit is preferably not more than 72, more preferably not more than 70, and even more preferably not more than 68.

Moreover, the core, although not subject to any particular limitation, has a specific hardness profile which preferably satisfies the hardness relationship A>B<C≥D>E>F. In addition, it is preferable for the value A-F to be not more than 19, for the core to be formed in such a way that A has the highest hardness among A to F, and for the value A-C to be from 0 to 8. In cases where the above conditions are not satisfied, this may lead to a diminished feel at impact and a reduced durability to cracking.

The value of A-C is preferably from 0 to 8. The lower limit for this value is more preferably greater than 0, even more preferably at least 1, and most preferably at least 2. The upper limit is more preferably not more than 6, and even more preferably not more than 4. The value of A-F has a lower limit of preferably at least 2, more preferably at least 4, and even more preferably at least 6. The upper limit in this value is preferably not more than 19, more preferably not more than 18, even more preferably not more than 17, and most preferably not more than 16.

In the practice of the invention, the core may be subjected to surface treatment with a solution containing a haloisocyanuric acid and/or a metal salt thereof.

Prior to surface-treating the core with a solution containing a haloisocyanuric acid and/or a metal salt thereof, adhesion between the core surface and the adjoining cover material can be further enhanced by subjecting the surface of the core to grinding treatment ("surface grinding").

Such grinding treatment removes the skin layer from the surface of the vulcanized core, and thus makes it possible to both enhance the ability of the solution of haloisocyanuric acid and/or a metal salt thereof to penetrate the core surface and also to increase the surface area of contact with the adjoining cover material. Exemplary surface grinding methods include buffing, barrel grinding and centerless grinding.

The haloisocyanuric acid and metal salts thereof are compounds of the following formula (I).

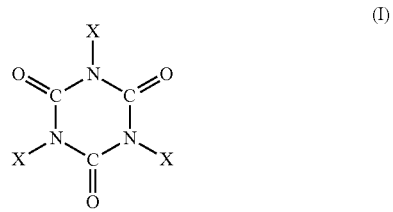

In the formula, X is a hydrogen atom, a halogen atom or an alkali metal atom. At least one occurrence of X is a halogen atom. Preferred halogen atoms include fluorine, chlorine and bromine, with chlorine being especially preferred. Preferred alkali metal atoms include lithium, sodium and potassium.

Illustrative examples of the haloisocyanuric acid and/or a metal salt thereof include chloroisocyanuric acid, sodium chloroisocyanurate, potassium chloroisocyanurate, dichloroisocyanuric acid, sodium dichloroisocyanurate, sodium dichloroisocyanurate dihydrate, potassium dichloroisocyanurate, trichloroisocyanuric acid, tribromoisocyanuric acid, dibromoisocyanuric acid, bromoisocyanuric acid, sodium and other salts of dibromisocyanuric acid, as well as hydrates thereof, and difluoroisocyanuric acid. Of these, chloroisocyanuric acid, sodium chloroisocyanurate, potassium chloroisocyanurate, dichloroisocyanuric acid, sodium dichloroisocyanurate, potassium dichloroisocyanurate and trichloroisocyanuric acid are preferred because they are readily hydrolyzed by water to form acid and chlorine, and thus play the role of initiating addition reactions to the double bonds on the diene rubber molecules. The use of trichloroisocyanuric acid provides an especially outstanding adhesion-improving effect.

The haloisocyanuric acid and/or a metal salt thereof is preferably dissolved in water or an organic solvent and used as a solution.

When water is used as the solvent, the content of the haloisocyanuric acid and/or a metal salt thereof in the treatment solution, although not subject to any particular limitation, may be set to preferably at least 0.5 part by weight, more preferably at least 1 part by weight, and even more preferably at least 3 parts by weight, per 100 parts by weight of water. If the content of haloisocyanuric acid and/or a metal salt thereof is too low, the adhesion improving effect expected after core surface treatment may not be obtained and the durability to impact may be poor. The upper limit is the saturated solution concentration. However, from the standpoint of cost effectiveness, it is preferable to set the upper limit to about 10 parts by weight per 100 parts by weight of water. The core is immersed in the treatment solution for a length of time which, although not subject to any particular limitation, may be set to preferably at least 0.3 second, more preferably at least 3 seconds, and even more preferably at least 10 seconds. The upper limit is preferably not more than 5 minutes, and more preferably not more than 4 minutes. If the immersion time is too short, the anticipated treatment effects may not be obtained, whereas if the immersion time is too long, a loss in productivity may occur.

In cases where use is made of an organic solvent, the solvent may be a known organic solvent, with the use of an organic solvent that is soluble in water being especially preferred. Examples include ethyl acetate, acetone and methyl ethyl ketone. Of these, acetone is especially preferred on account of its ability to penetrate the core surface. The use of a water-soluble solvent is preferred for a number of reasons. For example, such solvents readily take up moisture, the moisture which has been taken up readily undergoing a hydrolysis reaction with the haloisocyanuric acid and/or a metal salt thereof adhering to the core surface. Another reason is that, when water washing is used in a subsequent step, the affinity of water to the core surface increases, along with which a hydrolysis reaction between the water and the haloisocyanuric acid and/or a metal salt thereof more readily arises.

When dissolved in an organic solvent, the content of the haloisocyanuric acid and/or a metal salt thereof in the solution is preferably at least 0.3 wt %, more preferably at least 1 wt %, and even more preferably at least 2.5 wt %. At less than 0.3 wt %, the adhesion improving effect anticipated following core surface treatment may not be obtained, which may result in a poor durability to impact. The upper limit in the content may be as high as the saturated solution concentration. However, from the standpoint of cost effectiveness, when prepared as an acetone solution, for example, setting the upper limit in content to about 10 wt % is preferred. The core is immersed in the solution for a length of time which, although not subject to any particular limitation, is preferably at least 0.3 second, more preferably at least 3 seconds, and even more preferably at least 10 seconds. The upper limit is preferably not more than 5 minutes, and more preferably not more than 4 minutes. If the immersion time is too short, the desired effects of treatment may not be obtained, whereas if the immersion time is too long, a loss in productivity may occur.

The method of treating the core surface with a haloisocyanuric acid and/or a metal salt thereof is exemplified by methods which involve coating the core surface with a solution of haloisocyanuric acid and/or a metal salt thereof by brushing or spraying on the solution, and methods in which the core is immersed in a solution of the haloisocyanuric acid and/or a metal salt thereof. From the standpoint of productivity and high penetrability of the core surface by the solution, the use of an immersion method is especially preferred.

After the core has been surface treated with a solution containing haloisocyanuric acid and/or a metal salt thereof, it is preferable to wash the surface of the core with water. Water washing of the core surface may be carried out by a method such as running water, spraying, or soaking in a washing tank. However, because the aim here is not merely to wash, but also to initiate and promote the desired treatment reactions, the washing method should be one that is not too vigorous. Accordingly, preferred use may be made of washing by soaking in a washing tank. In such a case, it is desirable to place the cores to be washed from about one to five times in a washing tank that has been filled with fresh water.

Treating the core surface with a haloisocyanuric acid and/or a metal salt thereof greatly improves adhesion between the core surface and the cover. The reason for this is not well understood, but is thought to be as follows.

First, the haloisocyanuric acid and/or a metal salt thereof, together with the solvent, penetrates to the interior of the diene rubber making up the core and approaches the vicinity of the double bonds on the diene rubber backbone. Water then enters the core surface, whereupon the haloisocyanuric acid and/or a metal salt thereof is hydrolyzed by the water, releasing the halogen. The halogen attacks a double bond on the diene rubber backbone located nearby, as a result of which an addition reaction proceeds. In the course of this addition reaction, the liberated isocyanuric acid is added, together with the halogen, to the diene rubber backbone while retaining its cyclic structure. The added isocyanuric acid has three —NHCO— structures on the molecule.

Because —NHCO— structures are thereby conferred to the core surface that has been treated with the haloisocyanuric acid and/or a metal salt thereof, adhesion with the cover material improves further. It is most likely because of this that the durability of the golf ball to impact improves. Moreover, when a polyurethane elastomer or polyamide elastomer having the same —NHCO— structures on the polymer molecules is used as the cover material, the affinity increases even further, presumably increasing the durability to impact.

Following surface treatment, when the material at the surface portion of the solid core is examined by differential scanning calorimetry (DSC), no exothermic or endothermic peaks are observed from room temperature to 300° C. This means that the functional groups which have been introduced maintain a stable state within this temperature range. In other words, during molding of the cover material, the functional groups which have been introduced do not undergo degradation or the like due to heat, and thus continue to be effective.

Also, because melting in the manner of a hot melt resin does not arise, deleterious effects on durability and quality of appearance, such as resin bleed out to the parting line, do not occur. In addition, the very fact that the material in the surface portion of the solid core following the surface treatment described above is stable may be regarded as evidence that the isocyanuric acid having a melting point above 300° C. has been added with its molecular structure still intact.

In cases where, using an organic solvent, the addition of isocyanuric acid and chlorine to the surface of diene rubber has occurred, changes in the bonding states before and after addition appear in an infrared absorption spectrum as increases in the C=O bond (stretching) absorption peak at 1725 to 1705 $cm^{-1}$, the broad N—H bond (stretching) absorption peak at 3450 to 3300 $cm^{-1}$, and the C—Cl bond absorption peak at 800 to 600 $cm^{-1}$. Hence, by measuring the IR absorption spectrum of a surface-treated core and confirming increases in these absorption peaks, it is possible to qualitatively confirm that isocyanuric acid and chlorine addition to diene rubber molecules at the core surface has indeed occurred.

Next, the material making up the cover which directly encases the core is described.

No particular limitation is imposed on the cover resin material in this invention, provided the material has a breaking strength of from 20 to 80 MPa and an elongation of from 150 to 600%. However, preferred use may be made of an ionomer resin or a thermoplastic resin such as polyurethane. The use of a resin material composed primarily of polyurethane is especially preferred. For example, use may be made of a thermoplastic polyurethane elastomer or a thermoset polyurethane resin, with the use of a thermoplastic polyurethane elastomer being especially preferred.

The breaking strength of the cover resin material is at least 20 MPa, and may be set to preferably at least 25 MPa, more preferably at least 30 MPa, and most preferably at least 35 MPa. The upper limit is not more than 80 MPa, and may be set to preferably not more than 75 MPa, more preferably not more than 70 MPa, and most preferably not more than 65 MPa. The elongation of the cover resin material is at least 150%, and may be set to preferably at least 200%, more preferably at least 250%, and most preferably at least 300%. The upper limit is not more than 600%, and may be set to preferably not more than 550%, more preferably not more than 520%, and most preferably not more than 490%. The breaking strength and elongation (tensile tests) refer to values measured in accordance with JIS K 7311-1995. By using such a cover resin material having a breaking strength and an elongation in the above-indicated ranges, the durability to cracking, durability to surface loss and durability to abrasion desired of a golf ball intended for long-term use can be improved.

The thermoplastic polyurethane elastomer has a structure composed of soft segments formed from a polymeric polyol (polymeric glycol) and hard segments formed from a chain extender and a diisocyanate. Here, the polymeric polyol serving as a starting material may be any which has hitherto been used in the art relating to thermoplastic polyurethane materials, and is not subject to any particular limitation. Exemplary polymeric polyols include polyester polyols and polyether polyols. Polyether polyols are more preferable than polyester polyols because they enable thermoplastic polyurethane materials having a high rebound resilience and excellent low-temperature properties to be synthesized. Illustrative examples of polyether polyols include polytetramethylene glycol and polypropylene glycol. Polytetramethylene glycol is especially preferred from the standpoint of the rebound resilience and the low-temperature properties. The polymeric polyol has an average molecular weight of preferably between 1,000 and 5,000. To synthesize a thermoplastic polyurethane material having a high rebound resilience, an average molecular weight of between 2,000 and 4,000 is especially preferred.

The chain extender employed is preferably one which has hitherto been used in the art relating to thermoplastic polyurethane materials. Illustrative examples include, but are not limited to, 1,4-butylene glycol, 1,2-ethylene glycol, 1,3-butanediol, 1,6-hexanediol and 2,2-dimethyl-1,3-propanediol. These chain extenders have an average molecular weight of preferably between 20 and 15,000.

The diisocyanate employed is preferably one which has hitherto been used in the art relating to thermoplastic polyurethane materials. Illustrative examples include, but are not limited to, aromatic diisocyanates such as 4,4'-diphenylmethane diisocyanate, 2,4-toluene diisocyanate and 2,6-toluene diisocyanate, and aliphatic diisocyanates such as hexamethylene diisocyanate. Depending on the type of isocyanate, control of the crosslinking reaction during injection molding may be difficult. In this invention, the use of 4,4'-diphenylmethane diisocyanate, which is an aromatic diisocyanate, is most preferred.

A commercial product may be advantageously used as the thermoplastic polyurethane material composed of the above materials. Illustrative examples include those available under the trade names Pandex T8180, Pandex T8195, Pandex T8290, Pandex T8295 and Pandex T8260 (all available from DIC Bayer Polymer, Ltd.), and those available under the trade names Resamine 2593 and Resamine 2597 (available from Dainichiseika Color & Chemicals Mfg. Co., Ltd.).

The above polyurethane, although not subject to any particular limitation, is preferably a material which is capable of melt-bonding with the above-described polyurethane resin powder (II); a material that, like the polyurethane resin powder (II), is a thermoplastic resin is advantageous because melt bonding can be expected to occur. The use of a polyurethane having a high isocyanate content is especially preferred, and makes it possible to improve adhesion with the core material.

The cover has a thickness which, although not subject to any particular limitation, is preferably at least 0.3 mm, more preferably at least 0.5 mm, and even more preferably at least 0.7 mm. The upper limit is preferably not more than 2.5 mm, more preferably not more than 1.9 mm, and even more preferably not more than 1.7 mm. If the cover thickness is larger than the above range, the ball rebound may decrease and the flight performance may worsen. On the other hand, if the cover thickness is smaller than the above range, the durability to cracking may decrease. In particular, when the ball is hit thin, or "topped," the cover may tear.

The cover has a specific gravity which, although not subject to any particular limitation, is preferably at least 1.13, more preferably at least 1.14, and even more preferably at least 1.15. The upper limit is preferably not more than 1.30, more preferably not more than 1.20, and even more preferably not more than 1.17.

The cover material has a Shore D hardness which, although not subject to any particular limitation, is preferably at least 30, more preferably at least 35, and even more preferably at least 38. The upper limit is preferably not more than 57, more preferably not more than 54, even more preferably not more than 51, and most preferably not more than 50. If the material hardness of the cover is higher than the above range, the appearance performance in long-term use (durability of markings) may decline, in addition to which the flight performance may markedly decrease. On the other hand, if the material hardness of the cover is lower than the above range, the durability to cracking may markedly decrease and, particularly when the ball is topped, the cover may tear. In addition, the spin rate may become very high, possibly shortening the distance traveled by the ball. In the invention, "Shore D hardness" refers to the hardness measured with a type D durometer in accordance with JIS K 7215 (Durometer D hardness).

The solid golf ball of the invention typically has numerous dimples formed on the surface thereof, each dimple having a spatial volume below a flat plane circumscribed by an edge of the dimple. In the invention, it is critical for the sum of the individual dimple spatial volumes, expressed as a ratio (VR) with respect to the volume of a hypothetical sphere representing the ball were it to have no dimples on the surface thereof, to be set to from 0.95 to 1.7. The lower limit of VR is preferably 1.0, more preferably 1.1, and most preferably 1.2. The upper limit of VR is preferably 1.6, more preferably 1.5, and most preferably 1.45.

Also, although not subject to any particular limitation, the dimples formed on the solid golf ball of the invention preferably satisfy conditions (1) to (6) below. Although satisfying all of the following conditions (1) to (6) at the same time is preferred, it is acceptable for any of these conditions alone to be satisfied.

Figure 3:
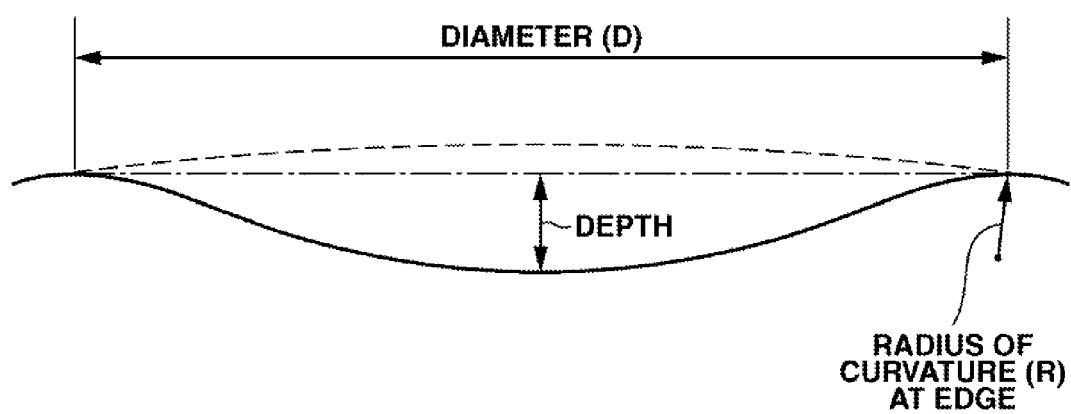
FIG. 3 is a schematic diagram showing an example of a dimple cross-section.

First, referring to FIG. 3, as condition (1), it is preferable for the dimples to have a peripheral edge provided with a roundness represented by a radius of curvature R in a range of from 0.5 to 2.5 mm. The lower limit of the radius of curvature R is more preferably 0.55 mm, and even more preferably 0.6 mm, and the upper limit is more preferably 1.8 mm, and even more preferably 1.5 mm.

Next, as condition (2), it is preferable for the ratio ER of a collective number of dimples RA having a radius of curvature R to diameter D ratio (R/D) of at least 20%, divided by the total number of dimples N on the surface of the ball, to be in a range of from 15 to 95%. Here, the ratio R/D is expressed as a percentage (R/D×100%), a larger value indicating a dimple in which the rounded part of the dimple accounts for a larger proportion of the dimple size and which has a smoother cross-sectional shape. The ratio ER indicates the number of such smooth dimples as a proportion of the total number of dimples; by setting ER in a range of from 15 to 95%, damage to the paint film at dimple edges can be effectively suppressed. The upper limit in the ratio R/D is preferably not more than 60%, and more preferably not more than 40%. The lower limit in the ratio ER is more preferably at least 20%, and even more preferably at least 25%, and the upper limit is more preferably not more than 90%, even more preferably not more than 85%, and most preferably not more than 70%.

As condition (3), it is preferable for the ball to have thereon a plurality of dimple types of differing diameter, and for the ratio DER of a combined number of dimples DE obtained by adding together dimples having an own diameter and having an own radius of curvature larger than or equal to a radius of curvature of dimples of larger diameter than the own diameter plus dimples of a type having a largest diameter, divided by the total number N of dimples on the surface of the ball, to be at least 80%.

Generally, at a fixed dimple depth (see FIG. 3), the radius of curvature R representing the roundness provided to the peripheral edges of the dimples is smaller at smaller dimple diameters. However, above condition (3), by such means as adjusting the depth, sets the radius of curvature R representing the roundness of the peripheral edge to be as large as possible even in dimples having a small diameter, thus forming dimples having a smooth cross-sectional shape, and also increases the proportion of such smooth dimples by setting the above ratio DER to at least 80%, in this way more effectively suppressing damage to the paint film. The ratio DER is more preferably at least 85%, even more preferably at least 90%, and most preferably at least 93%. The upper limit in the ratio DER is 100%.

As condition (4), it is preferable for the number of dimple types of differing diameter D on the ball to be 3 or more, and more preferable for dimples of at least five types to be formed. In this case, the diameters D of the dimples, although not subject to any particular limitation, are preferably set in a range of from 1.5 mm to 7 mm, the lower limit being more preferably 1.8 mm and the upper limit being more preferably 6.5 mm. The depths of the dimples, although likewise not subject to any particular limitation, are preferably set in a range of from 0.05 mm to 0.35 mm, the lower limit being more preferably 0.1 mm, and more preferably 0.13 mm, and the upper limit being more preferably 0.32 mm, and even more preferably 0.29 mm.

As condition (5), the total number N of dimples on the surface of the ball is preferably not more than 380, and more preferably not more than 350. The total number N of dimples is even more preferably in a range of from 220 to 340.

As condition (6), it is preferable for the dimples to be formed in such a way that the surface coverage SR of the dimples, which is the sum of the individual dimple surface areas, each defined by a flat plane circumscribed by an edge of the dimple (dash-dot line in FIG. 3), expressed as a percentage of the surface area of a hypothetical sphere representing the ball were it to have no dimples on the surface thereof, is from 60 to 74%. At a surface coverage SR greater than 74%, the intervals between neighboring dimples become too narrow, which may make it difficult to provide the dimple edges with a roundness having the radius of curvature specified in above condition (1). On the other hand, at a surface coverage SR below 60%, the aerodynamic performance decreases, as a result of which the distance traveled by the ball may decrease. The surface coverage SR has a lower limit of more preferably 65%, and even more preferably 68%, and an upper limit of more preferably 73%.

In one-piece golf balls, because rubber often has a somewhat yellowish tinge, a white enamel paint is generally applied as a first coat, following which a clear paint is applied. In the inventive ball, in order to ensure a good appearance, it is preferable to apply a clear paint to the surface of the ball. The resulting clear coat has a thickness at dimple lands (Y) which is at least 10 μm, preferably at least 12 μm, and most preferably at least 13 μm, but is not more than 30 μm, preferably not more than 25 μm, and most preferably not more than 20 μm; and a thickness at dimple edges (Z) which is at least 8 μm, preferably at least 10 μm, and most preferably at least 11 μm, but is not more than 28 μm, preferably not more than 23 μm, and most preferably not more than 18 μm. Also, the ratio Z/Y of edge areas (Z) to land areas (Y), expressed as a percentage (Z/Y×100), is at least 60%, preferably at least 70%, and most preferably at least 80%, but is not more than 100%, and preferably not more than 95%. Outside the above range, the durability of markings at dimple edges decreases markedly in long-term use.

The ball diameter is preferably at least 42 mm, more preferably at least 42.3 mm, and even more preferably at least 42.67 mm. The upper limit is preferably not more than 44 mm, more preferably not more than 43.8 mm, even more preferably not more than 43.5 mm, and most preferably not more than 43 mm.

The ball weight is preferably at least 44.5 g, more preferably at least 44.7 g, even more preferably at least 45.1 g, and most preferably at least 45.2 g. The upper limit is preferably not more than 47.0 g, more preferably not more than 46.5 g, and even more preferably not more than 46.0 g.

The ball has, upon initial measurement, a deflection (BH1) when compressed under a final load of 1,275 N (130 kgf) from an initial load of 98 N (10 kgf) of preferably at least 2.5 mm, more preferably at least 2.6 mm, and even more preferably at least 2.65 mm. The upper limit is preferably not more than 7.0 mm, more preferably not more than 6.0 mm, even more preferably not more than 5.5 mm, and most preferably not more than 5.0 mm. Also, letting CH be the deflection by the core when compressed under a final load of 1,275 N (130 kgf) from an initial load of 98 N (10 kgf), the ratio CH/BH1 between CH and BH1 is preferably at least 0.95, more preferably at least 0.96, and even more preferably at least 0.97. The upper limit is preferably not more than 1.1, more preferably not more than 1.09, and even more preferably not more than 1.08. If the ratio CH/BH1 is too large, the deflection of the finished ball relative to the deflection of the core will be very small (i.e., the ball will be harder). In this case, because the cover becomes harder, the feel at impact may decrease and the appearance may decline with long-term use. Conversely, if the ratio CH/BH1 is too small, the cover will be very soft, which may significantly lower the durability to cracking and lead to cracking of the cover, particularly when the ball is topped. In addition, the spin rate may undergo a large increase, which may result in a shorter distance of travel by the ball. Here, "upon initial measurement" means when the ball is measured within about 1 month following production of the ball.

Moreover, in the invention, the ball has, upon initial measurement, a rebound (BV1) of preferably at least 60 m/s, more preferably at least 63 m/s, even more preferably at least 65 m/s, and most preferably at least 67 m/s. The upper limit is preferably not more than 72 m/s, more preferably not more than 71.7 m/s, even more preferably not more than 71.4 m/s, and most preferably not more than 71.2 m/s. At a ball rebound outside of this range, the distance of the ball may dramatically decline or the ball may travel too far, making proper control of the ball impossible. As used herein, "ball rebound" is synonymous with ball initial velocity.

In the invention, from the standpoint of ensuring durability over an extended period of time, letting the golf ball of the invention have, upon initial measurement, a deflection BH1 (mm) when compressed under a final load of 1,275 N (130 kgf) from an initial load of 98 N (10 kgf) and an initial velocity BV1 (m/s), and letting the ball also have, when measured again after 350 days of standing following initial measurement, a deflection BH2 (mm) when compressed under a final load of 1,275 N 130 kgf) from an initial load of 98 N (10 kgf) and an initial velocity BV2 (m/s), the difference BH2-BH1 is preferably not more than 0.2 mm, more preferably not more than 0.15 mm, and even more preferably not more than 0.1 mm. Also, the value BV2-BV1 is preferably not more than 0.3 m/s, more preferably not more than 0.2 m/s, and even more preferably not more than 0.1 m/s. Here, "upon initial measurement" means when the ball is measured within about 1 month following production of the ball.

As described above, the solid golf ball of the invention, by utilizing a waste material, is beneficial to the global environment in that it conserves resources. Moreover, even during prolonged use, the inventive golf ball maintains its basic performance attributes (feel, flight, durability) at a high level.

EXAMPLES

The following Examples and Comparative Examples are provided to illustrate the invention, and are not intended to limit the scope thereof.

Examples 1 to 6, Comparative Examples 1 to 14

Rubber compositions formulated as shown in Tables 1 and 2 below were prepared using a kneader or roll mill, then molded and vulcanized under the conditions shown in Tables 1 and 2, thereby producing solid cores.

TABLE 1

| | | No. 1 | No. 2 | No. 3 | No. 4 | No. 5 | No. 6 |
|---|---|---|---|---|---|---|---|
| Formulation (pbw) | BR01 | 40 | 40 | 56 | 56 | 45 | 45 |
| | IR2200 | 5 | 5 | 5 | 5 | | |
| | BR730 | | | | | | |
| | SL563 | 55 | 55 | 39 | 39 | 55 | 55 |
| | Perhexa C-40 (40% dilution) | | | | | | |
| | Actual amount of addition | | | | | | |
| | Percumyl D | 0.8 | 0.8 | 0.8 | 0.8 | 0.8 | 0.8 |
| | Zinc oxide | 12.3 | 12.3 | 12.8 | 12.8 | 14.8 | 14.8 |
| | Barium sulfate | 9.6 | 9.6 | 9.1 | 9.1 | 7 | 7 |
| | Antioxidant | 0.2 | 0.2 | 0.2 | 0.2 | 0.2 | 0.2 |
| | Methacrylic acid | 12 | 12 | 12.5 | 12.5 | 14.5 | 14.5 |
| | Zinc methacrylate | | | | | | |
| | Zinc acrylate | | | | | | |
| | Titanium oxide | | | | | | |
| Powders | Polyurethane resin powder | 3 | 7.5 | 3 | 4 | 3 | 4 |
| | MAA rubber powder | 13.5 | 6 | 13.5 | 17.5 | 13.5 | 10 |
| | ZDA rubber powder | | 7.5 | | | | 7.5 |
| | Total | 16.5 | 21 | 16.5 | 21.5 | 16.5 | 21.5 |
| Vulcanization conditions | Temperature (° C.) | 170 | 170 | 170 | 170 | 170 | 170 |
| | Time (min) | 20 | 20 | 20 | 20 | 20 | 20 |

TABLE 2

| | | No. 7 | No. 8 | No. 9 | No. 10 | No. 11 | No. 12 | No. 13 | No. 14 | No. 15 | No. 16 |
|---|---|---|---|---|---|---|---|---|---|---|---|
| Formulation (pbw) | BR01 | 40 | 40 | 40 | 56 | 56 | 45 | 100 | 100 | | 95 |
| | IR2200 | 5 | 5 | 5 | 5 | 5 | | | | | 5 |
| | BR730 | | | | | | | | | 100 | |
| | SL563 | 55 | 55 | 55 | 39 | 39 | 55 | | | | |
| | Perhexa C-40 (40% dilution) | | | | | | | | 0.6 | 0.6 | |

TABLE 2-continued

|  |  | No. 7 | No. 8 | No. 9 | No. 10 | No. 11 | No. 12 | No. 13 | No. 14 | No. 15 | No. 16 |
|---|---|---|---|---|---|---|---|---|---|---|---|
|  | Actual amount of addition |  |  |  |  |  |  |  | 0.24 | 0.24 |  |
|  | Percumyl D | 0.8 | 0.8 | 0.8 | 0.8 | 0.8 | 0.8 | 1.2 | 0.6 | 0.6 | 0.8 |
|  | Zinc oxide | 12.3 | 12.3 | 12.3 | 12.8 | 12.8 | 14.8 | 23.5 | 9.5 | 9.5 | 23 |
|  | Barium sulfate | 9.6 | 9.6 | 9.6 | 9.1 | 9.1 | 7 |  |  |  |  |
|  | Antioxidant | 0.2 | 0.2 | 0.2 | 0.2 | 0.2 | 0.2 | 0.2 | 0.1 | 0.1 | 0.2 |
|  | Methacrylic acid | 12 | 12 | 12 | 12.5 | 12.5 | 14.5 | 29 |  |  | 22.5 |
|  | Zinc methacrylate |  |  |  |  |  |  |  | 26 |  |  |
|  | Zinc acrylate |  |  |  |  |  |  |  |  | 26 |  |
|  | Titanium oxide |  |  |  |  |  |  |  |  |  | 4 |
| Powders | Polyurethane resin powder |  | 31 | 7.5 |  | 31 |  | 3 | 3 | 3 | 3 |
|  | MAA rubber powder |  | 31 | 6 |  | 31 |  | 13.5 | 13.5 | 13.5 | 13.5 |
|  | ZDA rubber powder |  |  | 7.5 |  |  |  |  |  |  |  |
|  | Total |  | 62 | 21 |  | 62 |  | 16.5 | 16.5 | 16.5 | 16.5 |
| Vulcanization conditions | Temperature (° C.) | 170 | 170 | 170 | 170 | 170 | 170 | 170 | 160 | 160 | 170 |
|  | Time (min) | 20 | 20 | 20 | 20 | 20 | 20 | 20 | 13 | 13 | 30 |

Details on the ingredients shown in Tables 1 and 2 are provided below.

BR01: A butadiene rubber synthesized with a nickel catalyst, available from JSR Corporation; Mooney viscosity ML, 46

IR2200: An isoprene rubber, available from JSR Corporation; Mooney viscosity ML, 82

BR730: A butadiene rubber synthesized with a neodymium catalyst, available from JSR Corporation; Mooney viscosity ML, 55

SL563: A solution-polymerized styrene-butadiene rubber, available from JSR Corporation; styrene bond content, 20 wt %

Perhexa C-40: An organic peroxide, available from NOF Corporation; 1,1-bis(t-butylperoxy)cyclo-hexane. Because "Perhexa C-40" is a 40% dilution, the actual amount of addition is also mentioned in the tables.

Percumyl D: An organic peroxide, available from NOF Corporation; dicumyl peroxide Zinc oxide: Available from Sakai Chemical Co., Ltd.

Antioxidant: "Nocrac NS-6," available from Ouchi Shinko Chemical Industry Co., Ltd.

Methacrylic acid: Available from Kuraray Co., Ltd.

Zinc methacrylate: Available from Asada Chemical Industry Co., Ltd.

Zinc acrylate: Available from Nihon Jyoryu Kogyo Co., Ltd.

Titanium oxide: Available from Ishihara Sangyo Kaisha, Ltd.

Polyurethane resin powder:
Powder having a particle size of 1 mm and below recovered by finely grinding Cover Material A shown in Table 3 below with a granulator, and applying the finely ground material to a sieve having a mesh size of 1 mm. In the case of Core Material No. 9 in Table 2, use was made of a powder having a particle size of 4 to 5 mm recovered by applying the ground material remaining on a sieve having a mesh size of 4 mm to a sieve having a mesh size of 5 mm.

MAA rubber powder: Powder having a particle size of 1 mm and below recovered by finely grinding Core Material No. 1 shown in Table 1 with a granulator, and applying the finely ground material to a sieve having a mesh size of 1 mm. In the case of Core Material No. 9 in Table 2, use was made of a powder having a particle size of 4 to 5 mm recovered by applying the ground material remaining on a sieve having a mesh size of 4 mm to a sieve having a mesh size of 5 mm.

ZDA rubber powder: Powder having a particle size of 1 mm and below recovered by finely grinding Core Material No. 10 shown in Table 2 with a granulator, and applying the finely ground material to a sieve having a mesh size of 1 mm. In the case of Core Material No. 9 in Table 2, use was made of a powder having a particle size of 4 to 5 mm recovered by applying the ground material remaining on a sieve having a mesh size of 4 mm to a sieve having a mesh size of 5 mm.

In the respective examples, the core was set in a mold for injection-molding a cover, and the material formulated as shown in Table 3 below was injection-molded over the core to form the cover.

TABLE 3

|  |  | A | B | C | D |
|---|---|---|---|---|---|
| Formulation (pbw) | Himilan 1557 |  |  | 50 |  |
|  | Himilan 1601 |  |  | 50 |  |
|  | Himilan AM7327 |  |  |  | 50 |
|  | Surlyn 6320 |  |  |  | 50 |
|  | Pandex T8260 |  | 25 |  |  |
|  | Pandex T8195 | 100 | 75 |  |  |
|  | Magnesium stearate |  |  | 1 | 1 |
|  | Titanium dioxide | 3.5 | 3.5 | 2.1 | 2.1 |
|  | Polyethylene wax | 1.5 | 1.5 |  |  |

Details on the materials used in the cover compositions in Table 3 are provided below.

Himilan: Ionomer resins available under this trade name from DuPont-Mitsui Polychemicals Co., Ltd.

Surlyn: An ionomer resin available under this trade name from E.I. DuPont de Nemours & Co.

Pandex: Thermoplastic polyurethane elastomers available under this trade name from DIC Bayer Polymer, Ltd.

Magnesium stearate: Available from NOF Corporation

Titanium dioxide: Available under the trade name "Tipaque R550" from Ishihara Sangyo Kaisha, Ltd.

Polyethylene wax: Available under the trade name "Sanwax 161P" from Sanyo Chemical Industries, Ltd.

In order to form a predetermined dimple pattern on the surface of the cover, a plurality of protrusions corresponding to the dimple pattern were formed in the mold cavity, by means of which dimples were impressed onto the surface of the cover at the same time that the cover was injection-molded. Details on the dimples are given below in Table 4. The markings shown in FIG. 5 were printed on the ball surface. In addition, the ball was clear-coated with a paint composed of 100 parts by weight of polyester resin (acid value, 6; hydroxyl value, 168) (solids)/butyl acetate/propylene glycol monomethyl ether acetate (PMA) in a weight ratio of 70/15/15 as the base; 150 parts by weight of a non-yellowing polyisocyanate, specifically an adduct of hexamethylene diisocyanate (available from Takeda Pharmaceutical Co., Ltd. as Takenate D-160N; NCO content, 8.5 wt %; solids content, 50 wt %) as the curing agent; and 150 parts by weight of butyl acetate. In Comparative Example 14, a coating of white enamel paint was applied as a base coat for clear coating.

After holding the core isothermally at 23±1° C., JIS-C hardness measurements were carried out on the core surface in accordance with JIS K 6301-1975 (at two places in each of N=5 samples).

TABLE 4

Figure 4A:
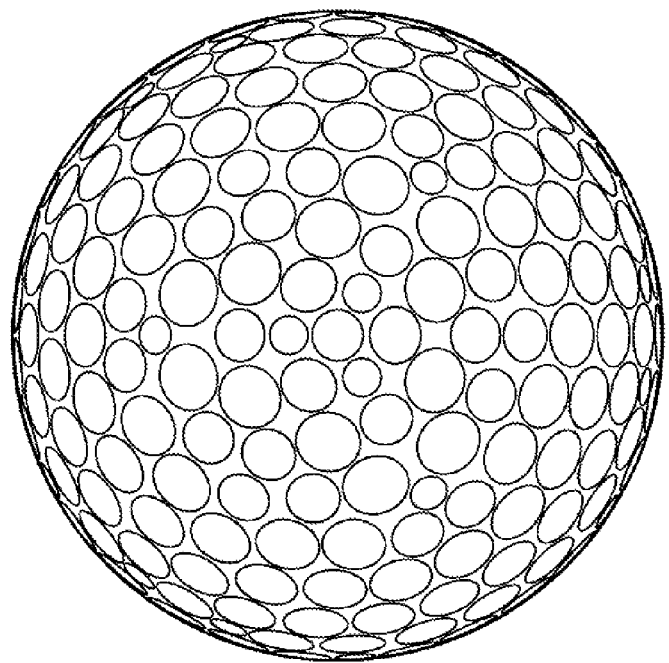
FIG. 4A is a top view and FIG. 4B is a side view showing an example of a dimple configuration.
Figure 4B:
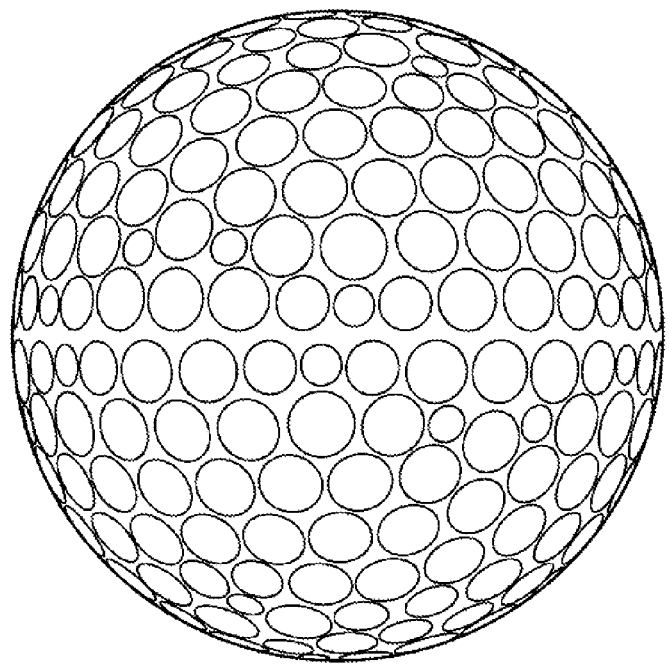

| | Dimple No. | Number | Diameter (D) (mm) | Depth (mm) | R (mm) | R/D ratio | N (number) | RA (number) | ER (%) | DE (number) | DER (%) | SR (%) | VR (%) | Configuration |
|---|---|---|---|---|---|---|---|---|---|---|---|---|---|---|
| Dimple I | 1 | 24 | 4.4 | 0.263 | 0.65 | 15 | 338 | 102 | 30 | 330 | 98 | 72 | 1.31 | FIG. 4 |
| | 2 | 204 | 4.2 | 0.252 | 0.65 | 15 | | | | | | | | |
| | 3 | 66 | 3.6 | 0.231 | 0.75 | 21 | | | | | | | | |
| | 4 | 12 | 2.7 | 0.170 | 0.8 | 30 | | | | | | | | |
| | 5 | 24 | 2.5 | 0.154 | 0.8 | 32 | | | | | | | | |
| | 6 | 8 | 3.4 | 0.160 | 0.45 | 13 | | | | | | | | |
| Dimple II | 1 | 24 | 4.4 | 0.287 | 0.6 | 14 | 338 | 102 | 30 | 330 | 98 | 72 | 1.41 | FIG. 4 |
| | 2 | 204 | 4.2 | 0.274 | 0.6 | 14 | | | | | | | | |
| | 3 | 66 | 3.6 | 0.249 | 0.72 | 20 | | | | | | | | |
| | 4 | 12 | 2.7 | 0.180 | 0.75 | 28 | | | | | | | | |
| | 5 | 24 | 2.5 | 0.154 | 0.8 | 32 | | | | | | | | |
| | 6 | 8 | 3.4 | 0.160 | 0.45 | 13 | | | | | | | | |
| Dimple III | 1 | 24 | 4.4 | 0.216 | 0.5 | 11 | 338 | 36 | 11 | 306 | 91 | 72 | 0.99 | FIG. 4 |
| | 2 | 204 | 4.2 | 0.209 | 0.5 | 12 | | | | | | | | |
| | 3 | 66 | 3.6 | 0.194 | 0.6 | 17 | | | | | | | | |
| | 4 | 12 | 2.7 | 0.151 | 0.6 | 22 | | | | | | | | |
| | 5 | 24 | 2.5 | 0.116 | 0.5 | 20 | | | | | | | | |
| | 6 | 8 | 3.4 | 0.160 | 0.5 | 15 | | | | | | | | |

The abbreviations and symbols relating to dimples which appear in Table 4 are explained below.

R: Radius of curvature representing roundness provided at the peripheral edge of a dimple R/D ratio: Ratio of radius of curvature R to diameter D N: Total number of dimples RA: Collective number of dimples having an R/D ratio of at least 20%

ER: Ratio of RA to total number of dimples N

DE: Sum of the number of dimples having an own diameter and having an own radius of curvature larger than or equal to a radius of curvature of dimples of larger diameter than the own diameter, plus the number of dimples of a type having a largest diameter DER: Ratio of DE to the total number of dimples N SR: Sum of individual dimple surface areas, each defined by a flat plane circumscribed by an edge of the dimple, expressed as a percentage of the surface area of a hypothetical sphere representing the ball were the ball to have no dimples on the surface thereof.

VR: Sum of individual dimple spatial volumes, each formed below a flat plane circumscribed by an edge of the dimple, expressed as a percentage of the volume of a hypothetical sphere representing the ball were the ball to have no dimples on the surface thereof The golf balls produced as described above were evaluated by the following methods. The results are presented in Tables 5 to 7.

Deflection of Core and Finished Ball (mm)

The deflections (mm) of the cores and finished balls when compressed at a rate of 10 mm/min under a final load of 1,275 N (130 kgf) from an initial load of 98 N (10 kgf) were measured. The tests were performed using the model 4204 test system from Instron Corporation.

Cross-Sectional Hardness of Core

The core was cut with a fine cutter and, after holding the core isothermally at 23±1° C., the JIS-C hardnesses at above positions B to F were measured in accordance with JIS K 6301-1975 (at two places in each of N=5 samples).

Surface Hardness of Core

Rebound of Core and Ball (Initial Velocity)

The initial velocity was measured using an initial velocity measuring apparatus of the same type as the USGA drum rotation-type initial velocity instrument approved by the R&A. The cores and balls used as the samples were held isothermally at a temperature of 23±1° C. for at least 3 hours, then tested in a room temperature (23±2° C.) chamber. Ten samples were each hit twice, and the time taken for the samples to traverse a distance of 6.28 ft (1.91 m) was measured and used to compute the initial velocity.

Cover Material Hardness

A cover sheet was formed and, after holding the samples isothermally at 23±1° C., the Shore D hardness was measured in accordance with ASTM D-2240.

Breaking Strength and Elongation of Cover Material (Tensile Tests)

The material was formed into a 2 mm thick sheet, and held in a 23±1° C. atmosphere for two weeks. This sample was shaped into dumbbell-shaped test specimens in accordance with JIS K 7311-1995, and the specimens were subjected to measurement in a 23±2° C. atmosphere at a test rate of 5 mm/s, also in accordance with JIS K 7311-1995. The average breaking strength and elongation of each material were calculated from the measured values for five specimens.

Clear Coat Thickness

Lands (Y): The thickness of the clear coat on land areas at intermediate positions between dimples was measured.

Edges (Z): The thickness of the clear coat on dimple edge areas was measured.

The above measurements were carried out at three places on each of two balls in the respective examples, and the average of these measurements was determined.

Distance

A TourStage X-Drive 701 (loft angle, 9°), manufactured by Bridgestone Sports Co., Ltd., was mounted as a driver (W#1) on a golf swing robot, and the ball was struck at a head speed (HS) of 45 m/s. Both the spin rate of the ball immediately after impact and the total distance traveled by the ball were measured.

In addition, the total distance of the ball was measured again after carrying out the durability of markings test below.

Durability to Cracking

The durability of the golf ball to cracking was evaluated using an ADC Ball COR Durability Tester produced by Automated Design Corporation (U.S.). This tester functions so as to fire a golf ball pneumatically and cause it to repeatedly strike two metal plates arranged in parallel. The incident velocity against the metal plates was set at 43 m/s. The number of shots required until cracking of the golf ball arose was measured, and the average value for five golf balls (N=5) was determined.

Low-Temperature Scuffing

After being held isothermally at a temperature of 0±1° C. for at least 3 hours, the ball was struck at a head speed (HS) of 33 m/s with a driver (W#1), specifically a TourStage X-Wedge (loft angle, 52°; manufactured by Bridgestone Sports Co., Ltd.), mounted on a golf swing robot, or was struck at a head speed (HS) of 33 m/s with a pitching sand wedge, specifically a TourStage VIQ (loft angle, 50°; titanium face, 2008 edition; manufactured by Bridgestone Sports Co., Ltd.), mounted on a golf swing robot, following which the condition of the ball surface was visually examined and rated according to the following 5-point scale. Tables 5 to 7 show the average values of the evaluation results obtained for the two above types of clubs.

5: Substantially no damage
4: Slight damage was apparent on surface, but was of minimal concern
3: Surface damage was of concern, but ball could be reused
2: Surface was damaged with some fraying, although reuse of ball was marginally possible
1: Surface was frayed, making reuse impossible Abrasion Test (Durability of Markings)

Ten golf balls and 3 liters of bunker sand were placed in a magnetic ball mill having an 8 liter capacity and mixing was carried out for 144 hours, following which the balls were visually examined for any loss of markings and to assess the degree of surface scratching and the degree of loss of luster due to abrasion by the sand, as well as the degree of sand adhesion. The ball appearance was rated as "Good," "Fair" or "NG."

Feel

Ten teaching professionals hit the test balls with a driver (W#1) and rated the feel of the balls on impact as Good, somewhat hard (Fair), or too hard (NG).

TABLE 5

|  |  |  | Example | | | | | |
| --- | --- | --- | --- | --- | --- | --- | --- | --- |
|  |  |  | 1 | 2 | 3 | 4 | 5 | 6 |
| Core | Type |  | No. 1 | No. 2 | No. 3 | No. 4 | No. 5 | No. 6 |
|  | Diameter, mm |  | 39.9 | 39.9 | 39.3 | 39.3 | 39.9 | 39.9 |
|  | Specific gravity |  | 1.12 | 1.12 | 1.12 | 1.12 | 1.12 | 1.12 |
|  | Deflection under 10-130 kg compression (CH), mm |  | 5.1 | 5.05 | 5.1 | 5.1 | 4.3 | 4.25 |
|  | Rebound (CV), m/s |  | 69.0 | 69.2 | 71.5 | 71.4 | 68.6 | 68.8 |
|  | JIS-C hardness at core surface (A) |  | 68 | 69 | 69 | 69 | 73 | 73 |
|  | JIS-C hardness 2 mm inside core surface (B) |  | 64 | 64 | 65 | 65 | 69 | 69 |
|  | JIS-C hardness 5 mm inside core surface (C) |  | 66 | 66 | 67 | 67 | 71 | 71 |
|  | JIS-C hardness 10 mm inside core surface (D) |  | 65 | 64 | 67 | 67 | 69 | 69 |
|  | JIS-C hardness 15 mm inside core surface (E) |  | 61 | 62 | 64 | 64 | 65 | 65 |
|  | JIS-C hardness at core center (F) |  | 57 | 58 | 61 | 61 | 60 | 60 |
|  | JIS-C hardness difference between core surface and 5 mm inside core surface (A − C) |  | 2 | 3 | 2 | 2 | 2 | 2 |
|  | JIS-C hardness difference between core surface and center (A − F) |  | 11 | 11 | 8 | 8 | 13 | 13 |
| Cover | Material |  | A | A | A | A | B | B |
|  | Material hardness, Shore D |  | 45 | 45 | 45 | 45 | 50 | 50 |
|  | Breaking strength, MPa |  | 40 | 40 | 40 | 40 | 37 | 37 |
|  | Elongation, % |  | 360 | 360 | 360 | 360 | 260 | 260 |
|  | Specific gravity |  | 1.15 | 1.15 | 1.15 | 1.15 | 1.15 | 1.15 |
|  | Thickness, mm |  | 1.4 | 1.4 | 1.7 | 1.7 | 1.4 | 1.4 |
| Finished ball | Deflection under 10-130 kg loading 30 days after production (BH1), mm |  | 4.9 | 4.95 | 4.8 | 4.8 | 4.2 | 4.15 |
|  | Deflection under 10-130 kg loading 350 days after BH1 measurement (BH2), mm |  | 4.8 | 4.85 | 4.7 | 4.7 | 4.1 | 4.05 |
|  | Difference between BH1 and BH2, mm |  | −0.1 | −0.1 | −0.1 | −0.1 | −0.1 | −0.1 |
|  | Rebound 30 days after production (BV1), m/s |  | 68.7 | 68.9 | 70.6 | 70.5 | 68.3 | 68.5 |
|  | Rebound 350 days after BV1 measurement (BV2), m/s |  | 68.8 | 69 | 70.6 | 70.5 | 68.4 | 68.6 |
|  | Difference between BV1 and BV2, m/s |  | 0.1 | 0.1 | 0 | 0 | 0.1 | 0.1 |
|  | Diameter, mm |  | 42.7 | 42.7 | 42.7 | 42.7 | 42.7 | 42.7 |
| Core initial velocity − Ball initial velocity (CV − BV1) |  |  | 0.3 | 0.3 | 0.9 | 0.9 | 0.3 | 0.3 |
| Core deflection/Ball deflection (CH/BH1) |  |  | 1.04 | 1.02 | 1.06 | 1.06 | 1.02 | 1.02 |
| Dimples | Type |  | I | I | II | II | I | I |
| Clear coat thickness | Land areas (Y), μm |  | 15 | 15 | 17 | 17 | 15 | 15 |
|  | Edge areas (Z), μm |  | 13 | 13 | 15 | 15 | 13 | 13 |
|  | Coat thickness ratio (Z/Y × 100), % |  | 88 | 88 | 88 | 88 | 88 | 88 |
| Distance | HS 45, driver (30 days after production) | Spin rate, rpm | 3070 | 3030 | 3090 | 2940 | 3010 | 3010 |
|  |  | Total distance, m | 191 | 192 | 192 | 191 | 189 | 190 |
|  | HS 45, driver (after abrasion test) | Total distance, m | 188 | 189 | 189 | 188 | 186 | 187 |
|  | Distance difference | Total distance, m | −3 | −3 | −3 | −3 | −3 | −3 |

TABLE 5-continued

|  |  |  | Example |  |  |  |  |  |
|---|---|---|---|---|---|---|---|---|
|  |  |  | 1 | 2 | 3 | 4 | 5 | 6 |
| Durability | Durability to cracking | At incident velocity of 43 m/s | 880 | 850 | 1030 | 1030 | 960 | 910 |
|  | Low-temperature scuffing (at 0° C.) | HS, 38 m/s | 3 | 3 | 4 | 4 | 3 | 3 |
|  | Abrasion test (durability of markings) | After 144 hours of abrasion with sand | Good | Good | Good | Good | Good | Good |
| Feel | Driver |  | Good | Good | Good | Good | Good | Good |

TABLE 6

|  |  |  | Comparative Example |  |  |  |  |  |  |
|---|---|---|---|---|---|---|---|---|---|
|  |  |  | 1 | 2 | 3 | 4 | 5 | 6 | 7 |
| Core | Type |  | No. 7 | No. 8 | No. 9 | No. 10 | No. 11 | No. 12 | No. 7 |
|  | Diameter, mm |  | 39.9 | 39.9 | 39.9 | 39.3 | 39.3 | 39.9 | 39.9 |
|  | Specific gravity |  | 1.12 | 1.12 | 1.12 | 1.12 | 1.12 | 1.12 | 1.12 |
|  | Deflection under 10-130 kg compression (CH), mm |  | 5 | 5.2 | 5.05 | 5 | 5.2 | 4.2 | 5 |
|  | Rebound (CV), m/s |  | 69.2 | 68.4 | 69.2 | 71.7 | 70.9 | 68.8 | 69.2 |
|  | JIS-C hardness at core surface (A) |  | 69 | 67 | 68 | 70 | 68 | 74 | 69 |
|  | JIS-C hardness 2 mm inside core surface (B) |  | 64 | 64 | 64 | 65 | 65 | 69 | 64 |
|  | JIS-C hardness 5 mm inside core surface (C) |  | 66 | 66 | 66 | 67 | 67 | 71 | 66 |
|  | JIS-C hardness 10 mm inside core surface (D) |  | 64 | 65 | 66 | 66 | 67 | 68 | 64 |
|  | JIS-C hardness 15 mm inside core surface (E) |  | 59 | 63 | 62 | 62 | 66 | 63 | 59 |
|  | JIS-C hardness at core center (F) |  | 54 | 59 | 58 | 58 | 63 | 57 | 54 |
|  | JIS-C hardness difference between core surface and 5 mm inside core surface (A − C) |  | 3 | 1 | 2 | 3 | 1 | 3 | 3 |
|  | JIS-C hardness difference between core surface and center (A − F) |  | 15 | 8 | 10 | 12 | 5 | 17 | 15 |
| Cover | Material |  | A | A | A | A | A | A | C |
|  | Material hardness, Shore D |  | 45 | 45 | 45 | 45 | 45 | 45 | 60 |
|  | Breaking strength, MPa |  | 40 | 40 | 40 | 40 | 40 | 40 | 17 |
|  | Elongation, % |  | 360 | 360 | 360 | 360 | 360 | 360 | 100 |
|  | Specific gravity |  | 1.15 | 1.15 | 1.15 | 1.15 | 1.15 | 1.15 | 0.99 |
|  | Thickness, mm |  | 1.4 | 1.4 | 1.4 | 1.7 | 1.7 | 1.4 | 1.4 |
| Finished ball | Deflection under 10-130 kg loading 30 days after production (BH1), mm |  | 4.8 | 5 | 4.85 | 4.7 | 4.9 | 4.2 | 4.3 |
|  | Deflection under 10-130 kg loading 350 days after BH1 measurement (BH2), mm |  | 4.7 | 4.9 | 4.75 | 4.6 | 4.8 | 4.1 | 4.2 |
|  | Difference between BH1 and BH2, mm |  | −0.1 | −0.1 | −0.1 | −0.1 | −0.1 | −0.1 | −0.1 |
|  | Rebound 30 days after production (BV1), m/s |  | 68.9 | 68.1 | 68.9 | 70.8 | 70 | 68.5 | 68.4 |
|  | Rebound 350 days after BV1 measurement (BV2), m/s |  | 69 | 68.2 | 69 | 70.8 | 70 | 68.6 | 68.6 |
|  | Difference between BV1 and BV2, m/s |  | 0.1 | 0.1 | 0.1 | 0 | 0 | 0.1 | 0.2 |
|  | Diameter, mm |  | 42.7 | 42.7 | 42.7 | 42.7 | 42.7 | 42.7 | 42.7 |
| Core initial velocity − Ball initial velocity (CV − BV1) |  |  | 0.3 | 0.3 | 0.3 | 0.9 | 0.9 | 0.3 | 0.8 |
| Core deflection/Ball deflection (CH/BH1) |  |  | 1.04 | 1.04 | 1.04 | 1.06 | 1.06 | 1.00 | 1.16 |
| Dimples | Type |  | I | I | I | II | II | I | I |
| Clear coat thickness | Land areas (Y), μm |  | 15 | 15 | 15 | 17 | 17 | 15 | 15 |
|  | Edge areas (Z), μm |  | 13 | 13 | 13 | 15 | 15 | 13 | 13 |
|  | Coat thickness ratio (Z/Y × 100), % |  | 88 | 88 | 88 | 88 | 88 | 88 | 88 |
| Distance | HS 45, driver (30 days after production) | Spin rate, rpm | 2920 | 3070 | 3070 | 2940 | 3090 | 3080 | 3050 |
|  |  | Total distance, m | 192 | 188 | 192 | 193 | 189 | 190 | 189 |
|  | HS 45, driver (after abrasion test) | Total distance, m | 189 | 185 | 189 | 190 | 186 | 187 | 182 |
|  | Distance difference | Total distance, m | −3 | −3 | −3 | −3 | −3 | −3 | −7 |
| Durability | Durability to cracking | At incident velocity of 43 m/s | 530 | 470 | 500 | 680 | 620 | 610 | 890 |
|  | Low-temperature scuffing (at 0° C.) | HS, 38 m/s | 3 | 3 | 3 | 4 | 4 | 3 | 3 |
|  | Abrasion test (durability of markings) | After 144 hours of abrasion with sand | Good | Good | Good | Good | Good | Good | NG |
| Feel | Driver |  | Good | Good | Good | Good | Good | Good | NG |

TABLE 7

|  |  |  | Comparative Example | | | | | | |
| --- | --- | --- | --- | --- | --- | --- | --- | --- | --- |
|  |  |  | 8 | 9 | 10 | 11 | 12 | 13 | 14 |
| Core | Type | | No. 7 | No. 7 | No. 7 | No. 13 | No. 14 | No. 15 | No. 16 |
|  | Diameter, mm | | 39.9 | 37.3 | 42.3 | 39.9 | 39.9 | 39.9 | 42.7 |
|  | Specific gravity | | 1.12 | 1.12 | 1.12 | 1.13 | 1.12 | 1.12 | 1.12 |
|  | Deflection under 10-130 kg compression (CH), mm | | 5 | 5 | 5 | 1.8 | 3.9 | 3.9 | |
|  | Rebound (CV), m/s | | 69.2 | 69.2 | 69.2 | 73.3 | 76.4 | 76.6 | |
|  | JIS-C hardness at core surface (A) | | 69 | 69 | 69 | 89 | 69 | 69 | 79 |
|  | JIS-C hardness 2 mm inside core surface (B) | | 64 | 64 | 64 | 88 | 65 | 65 | 75 |
|  | JIS-C hardness 5 mm inside core surface (C) | | 66 | 66 | 66 | 87 | 68 | 68 | 77 |
|  | JIS-C hardness 10 mm inside core surface (D) | | 64 | 64 | 64 | 82 | 67 | 67 | 72 |
|  | JIS-C hardness 15 mm inside core surface (E) | | 59 | 59 | 59 | 76 | 64 | 64 | 69 |
|  | JIS-C hardness at core center (F) | | 54 | 54 | 54 | 73 | 61 | 61 | 66 |
|  | JIS-C hardness difference between core surface and 5 mm inside core surface (A − C) | | 3 | 3 | 3 | 2 | 1 | 1 | 2 |
|  | JIS-C hardness difference between core surface and center (A − F) | | 15 | 15 | 15 | 16 | 8 | 8 | 13 |
| Cover | Material | | D | A | A | A | A | A | |
|  | Material hardness, Shore D | | 45 | 45 | 45 | 45 | 45 | 45 | |
|  | Breaking strength, MPa | | 12 | 40 | 40 | 40 | 40 | 40 | |
|  | Elongation, % | | 120 | 360 | 360 | 360 | 360 | 360 | |
|  | Specific gravity | | 0.99 | 1.15 | 1.15 | 1.15 | 1.15 | 1.15 | |
|  | Thickness, mm | | 1.4 | 2.7 | 0.2 | 1.4 | 1.4 | 1.4 | |
| Finished ball | Deflection under 10-130 kg loading 30 days after production (BH1), mm | | 4.85 | 4.5 | 5 | 1.9 | 3.9 | 3.9 | 3.2 |
|  | Deflection under 10-130 kg loading 350 days after BH1 measurement (BH2), mm | | 4.75 | 4.5 | 5 | 1.9 | 3.6 | 3.6 | 3.2 |
|  | Difference between BH1 and BH2, mm | | −0.1 | 0 | 0 | 0 | −0.3 | −0.3 | 0 |
|  | Rebound 30 days after production (BV1), m/s | | 68 | 67.9 | 69.2 | 72.6 | 75.4 | 75.6 | 74.2 |
|  | Rebound 350 days after BV1 measurement (BV2), m/s | | 68.1 | 67.9 | 69.3 | 72.6 | 74.5 | 74.7 | 74.3 |
|  | Difference between BV1 and BV2, m/s | | 0.1 | 0 | 0.1 | 0 | −0.9 | −0.9 | 0.1 |
|  | Diameter, mm | | 42.7 | 42.7 | 42.7 | 42.7 | 42.7 | 42.7 | 42.7 |
| Core initial velocity − Ball initial velocity (CV − BV1) | | | 1.2 | 1.3 | 0.0 | 0.7 | 1.0 | 1.0 | |
| Core deflection/Ball deflection (CH/BH1) | | | 1.03 | 1.11 | 1.00 | 0.95 | 1.00 | 1.00 | |
| Dimples | Type | | I | III | I | I | I | I | I |
| Clear coat thickness | Land areas (Y), μm | | 15 | 17 | 15 | 15 | 15 | 15 | 15 |
|  | Edge areas (Z), μm | | 13 | 8 | 13 | 13 | 13 | 13 | 13 |
|  | Coat thickness ratio (Z/Y × 100), % | | 88 | 47 | 88 | 88 | 88 | 88 | 88 |
| Distance | HS 45, driver (30 days after production) | Spin rate, rpm | 3300 | 2570 | 3170 | 3630 | 3250 | 3220 | 3800 |
|  |  | Total distance, m | 187 | 193 | 192 | 211 | 224 | 225 | 217 |
|  | HS 45, driver (after abrasion test) | Total distance, m | 181 | 186 | 189 | 208 | 221 | 222 | 211 |
|  | Distance difference | Total distance, m | −6 | −7 | −3 | −3 | −3 | −3 | −6 |
| Durability | Durability to cracking | At incident velocity of 43 m/s | 560 | 1130 | 210 | 1020 | 455 | 120 | 620 |
|  | Low-temperature scuffing (at 0° C.) | HS, 38 m/s | 1 | 3 | 2 | 3 | 4 | 4 | 5 |
|  | Abrasion test (durability of markings) | After 144 hours of abrasion with sand | NG | NG | Good | Good | Good | Good | NG |
| Feel | Driver | | Good | Good | Good | NG | Good | Good | Good |

From the results in Tables 5 to 7, the comparative examples were confirmed, as indicated below, to be inferior to the working examples of the invention.

In the golf ball of Comparative Example 1, waste material powder was not included in the core, as a result of which adhesion between the core and the cover was poor and the durability to cracking was poor.

In the golf ball of Comparative Example 2, the amount of waste material powder included in the core was very large, as a result of which the core was brittle and the durability to cracking was poor.

In the golf ball of Comparative Example 3, the particle size of the waste material powder included in the core was very large, as a result of which the core was brittle and the durability to cracking was poor.

In the golf ball of Comparative Example 4, waste material powder was not included in the core, as a result of which adhesion between the core and the cover was poor and the durability to cracking was poor.

In the golf ball of Comparative Example 5, the amount of waste material powder included was very large, as a result of which the core was brittle and the durability to cracking was poor.

In the golf ball of Comparative Example 6, waste material powder was not included in the core, as a result of which adhesion between the core and the cover was poor and the durability to cracking was poor.

In the golf ball of Comparative Example 7, the cover had a small breaking strength and a small elongation, as a result of which the durability to abrasion was poor and the decrease in flight performance was large. In addition, the cover was hard, resulting in a poor feel at impact on shots with a driver.

In the golf ball of Comparative Example 8, the cover had a small breaking strength and a small elongation, as a result of which the durability to abrasion was poor and the decrease in flight performance was large.

In the golf ball of Comparative Example 9, the dimple edges had a small radius of curvature R, as a result of which the durability to abrasion was poor and the decrease in flight performance was large.

In the golf ball of Comparative Example 10, waste material powder was not included in the core, as a result of which adhesion between the core and the cove was poor. Also, the cover was too thin, as a result of which the durability to cracking was poor.

In the golf ball of Comparative Example 11, the core had a very small deflection, as a result of which the feel at impact on shots with a driver was poor.

In the golf ball of Comparative Example 12, the core contained zinc methacrylate. As a result, the changes over time in deflection and rebound were large, in addition to which the durability to cracking was poor.

In the golf ball of Comparative Example 13, the core contained zinc acrylate. As a result, the changes over time in deflection and rebound were large, in addition to which the durability to cracking was poor.

The golf ball of Comparative Example 14 had a one-piece construction in which the surface rubber material had a small breaking strength and a small elongation. As a result, the durability to cracking and the durability to abrasion were both poor, and the ball exhibited a large decline in flight performance (the breaking strength of the rubber material was 15 MPa, and the elongation was 88%). In addition, the feel of the ball on shots with a driver was poor.

The invention claimed is:

1. A solid golf ball comprising a core and a cover, wherein the core is formed of a rubber composition comprising a base rubber, a co-crosslinking agent, a crosslinking initiator and a metal oxide, the base rubber containing polybutadiene, a styrene-butadiene rubber and, optionally, an isoprene rubber, the co-crosslinking agent being methacrylic acid, and the rubber composition including from 0.05 to 60 parts by weight of powders, each of which has a particle size of not more than 3 mm and which consist of a combination of (I) a rubber powder and (II) a polyurethane resin powder per 100 parts by weight of the base rubber, where the rubber powder (I) is selected from among (I-a) a rubber powder obtained by granulating a rubber material containing methacrylic acid or a metal salt thereof and (I-b) a rubber powder obtained by granulating a rubber material containing acrylic acid or a metal salt of acrylic acid, and the polyurethane resin powder (II) is composed primarily of a thermoplastic polyurethane;
   the core has a deflection when compressed under a final load of 1,275 N (130 kgf) from an initial load of 98 N (10 kgf) of from 2.5 to 7.0 mm;
   the cover is formed of a resin material having a breaking strength of from 20 to 80 MPa and an elongation of from 150 to 600%; and
   the ball has formed on a surface thereof a plurality of dimples, each having a spatial volume below a flat plane circumscribed by an edge of the dimple, the sum of the dimple spatial volumes, expressed as a percentage (VR) of the volume of a hypothetical sphere were the ball to have no dimples on the surface thereof, being from 0.95 to 1.7.

2. The solid golf ball of claim 1, wherein the metal oxide is zinc oxide.

3. The solid golf ball of claim 1, wherein the polybutadiene accounts for up to 80 wt % of the base rubber in the rubber composition, the styrene-butadiene rubber accounts for between 20 and 80 wt % of the base rubber and the isoprene rubber accounts for between 0 and 60 wt % of the base rubber; and wherein the rubber composition includes from 6 to 40 parts by weight of methacrylic acid, from 6 to 30 parts by weight of the metal oxide, from 0.3 to 5.0 parts by weight of the crosslinking initiator, and from 0.1 to 1.0 part by weight of an antioxidant per 100 parts by weight of the base rubber.

4. The solid golf ball of claim 1, wherein the core has a specific gravity of from 1.05 to 1.2.

5. The solid golf ball of claim 1, wherein the polyurethane resin powder (II) has a particle size of not more than 1 mm.

6. The solid golf ball of claim 1, wherein the polyurethane resin powder (II) has a flow starting point of from 150 to 320° C.

7. The solid golf ball of claim 1, wherein the resin material of the cover is composed primarily of a polyurethane.

8. The solid golf ball of claim 7, wherein the polyurethane is a thermoplastic polyurethane.

9. The solid golf ball of claim 1, wherein the cover has a material hardness, expressed in terms of Shore D hardness, of from 30 to 57.

10. The solid golf ball of claim 1, wherein the cover has a thickness of from 0.3 to 2.5 mm.

11. The solid golf ball of claim 1, wherein the ball has an initial velocity of not more than 72 m/s.

12. The solid golf ball of claim 1, wherein the core has a deflection CH (mm) when compressed under a final load of 1,275 N (130 kgf) from an initial load of 98 N (10 kgf), the ball has, upon initial measurement, a deflection BH1 (mm) when compressed under a final load of 1,275 N (130 kgf) from an initial load of 98 N (10 kgf) and an initial velocity BV1 (m/s), and also has, when measured again after 350 days of standing following initial measurement, a deflection BH2 (mm) when compressed under a final load of 1,275 N 130 kgf) from an initial load of 98 N (10 kgf) and an initial velocity BV2 (m/s), such that:
   BH1 is from 2.5 to 7.0 mm,
   the ratio CH/BH1 is from 0.95 to 1.1,
   the difference BH2−BH1 is not more than 0.2 mm, and
   the difference BV2−BV1 is not more than 0.3 m/s.

13. The solid golf ball of claim 1, wherein the dimples formed on the surface of the ball satisfy conditions (1) to (6) below:
   (1) the dimples have a peripheral edge provided with a roundness represented by a radius of curvature R of from 0.5 to 2.5 mm;
   (2) the ratio ER of a collective number of dimples RA having a radius of curvature R to diameter D ratio (R/D) of at least 20%, divided by a total number of dimples N on the surface of the ball, is from 15 to 95%;
   (3) the ball has thereon a plurality of dimple types of differing diameter, and the ratio DER of a combined number of dimples DE obtained by adding together dimples having an own diameter and an own radius of curvature larger than or equal to a radius of curvature of dimples of larger diameter than said own diameter plus dimples of a type having a largest diameter, divided by the total number of dimples N on the surface of the ball, is at least 80%;
   (4) the number of dimple types of differing diameter is 3 or more;
   (5) the total number of dimples N is not more than 380; and
   (6) the surface coverage SR of the dimples, which is the sum of individual dimple surface areas, each defined by a flat plane circumscribed by an edge of the dimple, expressed as a percentage of the surface area of a hypothetical sphere were the ball to have no dimples on the surface thereof, is from 60 to 74%.

14. The solid golf ball of claim 1, wherein the polyurethane resin powder (II) is obtained by employing a granulator to finely grind defective moldings and golf balls which have been used and discarded, screening the finely ground material, and thereby collecting the polyurethane resin powder (II) having particle size of not more than 3 mm.

* * * * *